(12) United States Patent
Kim et al.

(10) Patent No.: US 12,481,392 B2
(45) Date of Patent: *Nov. 25, 2025

(54) TOUCH SENSING MODULE AND DISPLAY DEVICE INCLUDING THE SAME

(71) Applicant: Samsung Display Co., LTD., Yongin-si (KR)

(72) Inventors: Hyung Bae Kim, Yongin-si (KR); Jeon Min Kang, Yongin-si (KR); Hyun Wook Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 58 days.

This patent is subject to a terminal disclaimer.

(21) Appl. No.: 18/450,172

(22) Filed: Aug. 15, 2023

(65) Prior Publication Data

US 2024/0061527 A1 Feb. 22, 2024

(30) Foreign Application Priority Data

Aug. 17, 2022 (KR) .................. 10-2022-0102522

(51) Int. Cl.
*G06F 3/041* (2006.01)
*G06F 3/044* (2006.01)
*G06F 3/0354* (2013.01)

(52) U.S. Cl.
CPC .......... *G06F 3/04166* (2019.05); *G06F 3/041* (2013.01); *G06F 3/0412* (2013.01); *G06F 3/044* (2013.01); *G06F 3/0443* (2019.05); *G06F 3/0445* (2019.05); *G06F 3/0446* (2019.05); *G06F 3/03547* (2013.01); *G06F 3/041662* (2019.05)

(58) Field of Classification Search
CPC .... G06F 3/03547; G06F 3/041; G06F 3/0412; G06F 3/04166; G06F 3/041662; G06F 3/044; G06F 3/0443; G06F 3/0445; G06F 3/0446
USPC ........................................ 345/173
See application file for complete search history.

(56) References Cited

U.S. PATENT DOCUMENTS 10,162,451 B2 * 12/2018 Cheng ................ G06F 3/04164
10,768,749 B2 *  9/2020 Olley .................... G06F 3/0412
(Continued)

FOREIGN PATENT DOCUMENTS

KR   10-2023-0139951 A    10/2023

*Primary Examiner* — Jason M Mandeville
(74) *Attorney, Agent, or Firm* — Womble Bond Dickinson (US) LLP

(57) ABSTRACT

A touch sensing module includes: first driving electrodes arranged in parallel; first sensing electrodes intersecting the first driving electrodes; second driving electrodes on a rear side of the first driving electrode with a touch insulating layer therebetween such that they are associated with the first driving electrodes, respectively; second sensing electrodes on a rear side of the first sensing electrodes with the touch insulating layer therebetween such that they are associated with the first sensing electrodes, respectively; driving switching circuits electrically connecting the second driving electrodes to the first driving electrodes, respectively, or to a low-level voltage source; and a touch driver circuit configured to supply touch driving signals to the first driving electrodes and to detect touch sensing signals through the first sensing electrodes to detect touch position coordinates.

20 Claims, 15 Drawing Sheets

(56) References Cited

U.S. PATENT DOCUMENTS

| | | | |
|---|---|---|---|
| 11,556,202 B2 * | 1/2023 | Nathan | G06F 3/04164 |
| 12,079,422 B2 * | 9/2024 | Kim | G06F 3/0418 |
| 2008/0150903 A1 * | 6/2008 | Chuang | G06F 1/1692 |
| | | | 345/173 |
| 2009/0073134 A1 * | 3/2009 | Huang | G06F 3/041 |
| | | | 345/173 |
| 2016/0299619 A1 * | 10/2016 | Cheng | G06F 3/0445 |
| 2018/0095562 A1 * | 4/2018 | Hashida | G06F 3/0446 |
| 2022/0171489 A1 * | 6/2022 | Nathan | G06F 3/0412 |
| 2023/0305659 A1 | 9/2023 | Kim et al. | |
| 2024/0069670 A1 | 2/2024 | Kim et al. | |
| 2024/0419282 A1 * | 12/2024 | Kim | G06F 3/0418 |

\* cited by examiner

TOUCH SENSING MODULE AND DISPLAY DEVICE INCLUDING THE SAME

CROSS-REFERENCE TO RELATED APPLICATION

The present application claims priority to and the benefit of Korean Patent Application No. 10-2022-0102522, filed on Aug. 17, 2022, in the Korean Intellectual Property Office, the entire disclosure of which is incorporated herein by reference.

BACKGROUND

1. Field

Aspects of some embodiments of the present disclosure relate to a touch sensing module and a display device including the same.

2. Description of the Related Art

As the information-oriented society evolves, consumer demand for display devices in various applications is ever increasing. For example, display devices are being utilized in a variety of electronic devices such as smart phones, digital cameras, laptop computers, navigation devices, and smart televisions.

Display devices may include flat panel display devices such as liquid-crystal display devices, field emission display devices, and organic light-emitting display devices. Among such flat panel display devices, a light-emitting display device includes a light-emitting element that can emit light on its own, so that each of the pixels of the display panel can emit light by themselves. Accordingly, a light-emitting display device can display images without a backlight unit that supplies light to the display panel.

Display devices may also include a touch sensing module for sensing a user's touch as one of interface means. A touch sensing module includes a touch sensing unit in which touch electrodes are arranged, and a touch driver circuit that detects a touch position according to a change in the capacitance between the touch electrodes. The touch sensing module may be integrally formed on or may be mounted on a part of the display device where images are displayed.

The above information disclosed in this Background section is only for enhancement of understanding of the background and therefore the information discussed in this Background section does not necessarily constitute prior art.

SUMMARY

Aspects of some embodiments of the present disclosure include a touch sensing module that can reduce the amount of electromagnetic interference (EMI) radiation and a display device including the same.

Aspects of some embodiments of the present disclosure may also include a touch sensing module in which first and second touch electrodes are made up of a double layer and second touch electrodes are selectively used to reduce the amount of EMI radiation or improve the touch sensing performance.

It should be noted that characteristics of embodiments according to the present disclosure are not limited to the above-mentioned characteristics; and other characteristics of embodiments according to the present disclosure will be apparent to those skilled in the art from the following descriptions.

According to some embodiments of the disclosure, a touch sensing module comprising first driving electrodes arranged in parallel, first sensing electrodes intersecting the first driving electrodes, second driving electrodes on a rear side of the first driving electrode with a touch insulating layer therebetween such that they are associated with the first driving electrodes, respectively, second sensing electrodes on a rear side of the first sensing electrodes with the touch insulating layer therebetween such that they are associated with the first sensing electrodes, respectively, driving switching circuits electrically connecting the second driving electrodes to the first driving electrodes, respectively, or to a low-level voltage source, and a touch driver circuit configured to supply touch driving signals to the first driving electrodes and detect touch sensing signals through the first sensing electrodes to detect touch position coordinates.

According to some embodiments, the driving switching circuits comprise first driving switching circuits electrically connecting/disconnecting the second driving electrodes to/from the first driving electrodes, respectively, in response to a first switching control signal from the touch driver circuit, and second driving switching circuits electrically connecting/disconnecting the second driving electrodes to/from the low-level voltage source in response to a second switching control signal from the touch driver circuit.

According to some embodiments, the first driving switching circuits comprise at least one first switching element configured to electrically connect/disconnect at least one of the second driving electrodes to/from at least one of the first driving electrodes in response to the first switching control signal, and wherein the second driving switching circuits comprise at least one second switching element configured to electrically connect/disconnect at least one of the second driving electrodes to/from the low-level voltage source in response to the second switching control signal.

According to some embodiments, the touch driver circuit, in a non-touch sensing period, supplies the second switching control signal of a gate-on level to the second driving switching circuits, and the first switching control signal of a gate-off level to the first driving switching circuits.

According to some embodiments, the touch driver circuit, in a touch sensing period, supplies the second switching control signal of a gate-off level to the second driving switching circuits, and the first switching control signal of a gate-on level to the first driving switching circuits.

According to some embodiments, the touch driver circuit controls the driving switching circuits so that the second driving electrodes are electrically disconnected from the first driving electrodes and connected to the low-level voltage source during a non-touch sensing period, and supplies touch driving signals to the first driving electrodes to detect the touch sensing signal through the first sensing electrodes during the non-touch sensing period.

According to some embodiments, the touch driver circuit controls the driving switching circuits so that the second driving electrodes are electrically connected to the first driving electrodes and disconnected from to the low-level voltage source during a touch sensing period, and supplies touch driving signals to the first driving electrodes to detect the touch sensing signal through the first sensing electrodes during the touch sensing period.

According to some embodiments, the first sensing electrodes and the second sensing electrodes are electrically connected through at least one contact hole or at least one line.

According to some embodiments, the first driving electrodes are arranged in a first axis direction and a second axis direction, and adjacent ones of the first driving electrodes in the first axis direction are electrically connected while adjacent ones of the first driving electrodes in the second axis direction are electrically separated, and wherein adjacent ones of the first driving electrodes in the first axis direction are electrically connected through connection electrodes.

According to some embodiments, the first sensing electrodes are arranged in the first axis direction and the second axis direction, and adjacent ones of the first driving electrodes in the first axis direction are electrically connected while wherein adjacent ones of the first sensing electrodes in the first axis direction are electrically separated, and wherein the second sensing electrodes are all separated and electrically connected to the first sensing electrodes on a front side through at least one contact hole.

According to some embodiments, the second driving electrodes are arranged in the first axis direction and the second axis direction, and adjacent ones of the second driving electrodes in the first axis direction are electrically connected while adjacent ones of the second driving electrodes in the second axis direction are electrically separated, and wherein adjacent ones of the second driving electrodes in the first axis direction are in direct contact with each other and electrically connected to each other.

According to some embodiments, the connection electrodes are made of a same material as the second driving electrodes and are formed on a same layer as the second driving electrodes such that they are not electrically in contact with the second driving electrodes, and wherein adjacent ones of the first driving electrodes are electrically connected by a plurality of contact holes.

According to some embodiments, at least one of the first driving electrodes, the first sensing electrodes, the second driving electrodes and the second sensing electrodes is formed of a transparent metal material comprising indium tin oxide (ITO).

According to some embodiments, the driving switching circuits and the touch driver circuit are integrated and formed as an integrated circuit, and the integrated circuit is on a circuit film or a circuit board separately from the first and second driving electrodes.

According to some embodiments of the present disclosure, a display device comprising a display panel comprising a display area in which sub-pixels are arranged, and a touch sensing module on a front side of the display panel to sense a user's touch, wherein the touch sensing module comprises first driving electrodes arranged in parallel, first sensing electrodes intersecting the first driving electrodes, second driving electrodes on a rear side of the first driving electrode with a touch insulating layer therebetween such that they are associated with the first driving electrodes, respectively, second sensing electrodes on a rear side of the first sensing electrodes with the touch insulating layer therebetween such that they are associated with the first sensing electrodes, respectively, driving switching circuits electrically connecting the second driving electrodes to the first driving electrodes, respectively, or to a low-level voltage source, and a touch driver circuit configured to supply touch driving signals to the first driving electrodes and detect touch sensing signals through the first sensing electrodes to detect touch position coordinates.

According to some embodiments, the driving switching circuits comprise first driving switching circuits electrically connecting/disconnecting the second driving electrodes to/from the first driving electrodes, respectively, in response to a first switching control signal from the touch driver circuit, and second driving switching circuits electrically connecting/disconnecting the second driving electrodes to/from the low-level voltage source in response to a second switching control signal from the touch driver circuit.

According to some embodiments, the first driving switching circuits comprise at least one first switching element configured to electrically connect/disconnect at least one of the second driving electrodes to/from at least one of the first driving electrodes in response to the first switching control signal, and wherein the second driving switching circuits comprise at least one second switching element configured to electrically connect/disconnect at least one of the second driving electrodes to/from the low-level voltage source in response to the second switching control signal.

According to some embodiments, the touch driver circuit controls the driving switching circuits so that the second driving electrodes are electrically disconnected from the first driving electrodes and connected to the low-level voltage source during a non-touch sensing period, and supplies touch driving signals to the first driving electrodes to detect the touch sensing signal through the first sensing electrodes during the non-touch sensing period.

According to some embodiments, the first driving electrodes are arranged in a first axis direction and a second axis direction, and adjacent ones of the first driving electrodes in the first axis direction are electrically connected while adjacent ones of the first driving electrodes in the second axis direction are electrically separated, and wherein adjacent ones of the first driving electrodes in the first axis direction are electrically connected through connection electrodes.

According to some embodiments, the first sensing electrodes are arranged in the first axis direction and the second axis direction, and adjacent ones of the first driving electrodes in the first axis direction are electrically connected while adjacent ones of the first sensing electrodes in the first axis direction are electrically separated, and wherein the second sensing electrodes are all separated and electrically connected to the first sensing electrodes on a front side through at least one contact hole.

According to some embodiments of the present disclosure, a touch sensing module and a display device including the same can reduce the amount of EMI radiation. For example, it may be possible to reduce the amount of EMI radiation or improve the touch sensitivity and performance by selectively using the second touch electrodes among the first and second touch electrodes made up of a double layer.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and characteristics of embodiments according to the present disclosure will become more apparent by describing in more detail aspects of some embodiments thereof with reference to the attached drawings, in which.

DETAILED DESCRIPTION

Aspects of some embodiments of the present invention will now be described more fully hereinafter with reference to the accompanying drawings, in which aspects of some embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Each of the features of the various embodiments of the present disclosure may be combined or combined with each other, in part or in whole, and technically various interlocking and driving are possible. Embodiments according to the present disclosure may be implemented independently of each other or may be implemented together in an association.

Hereinafter, aspects of some embodiments of the present disclosure will be described in more detail with reference to the accompanying drawings.

Figure 1:
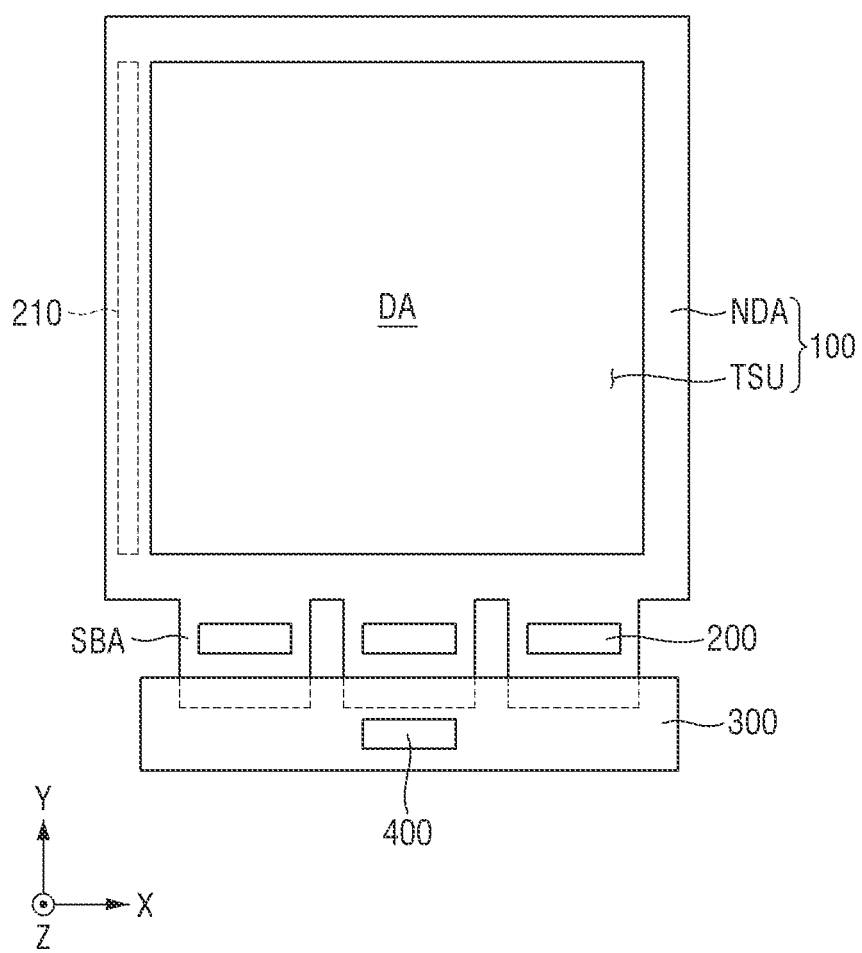
FIG. 1 is a plan view showing the configuration of a display device according to some embodiments of the present disclosure.
Figure 2:
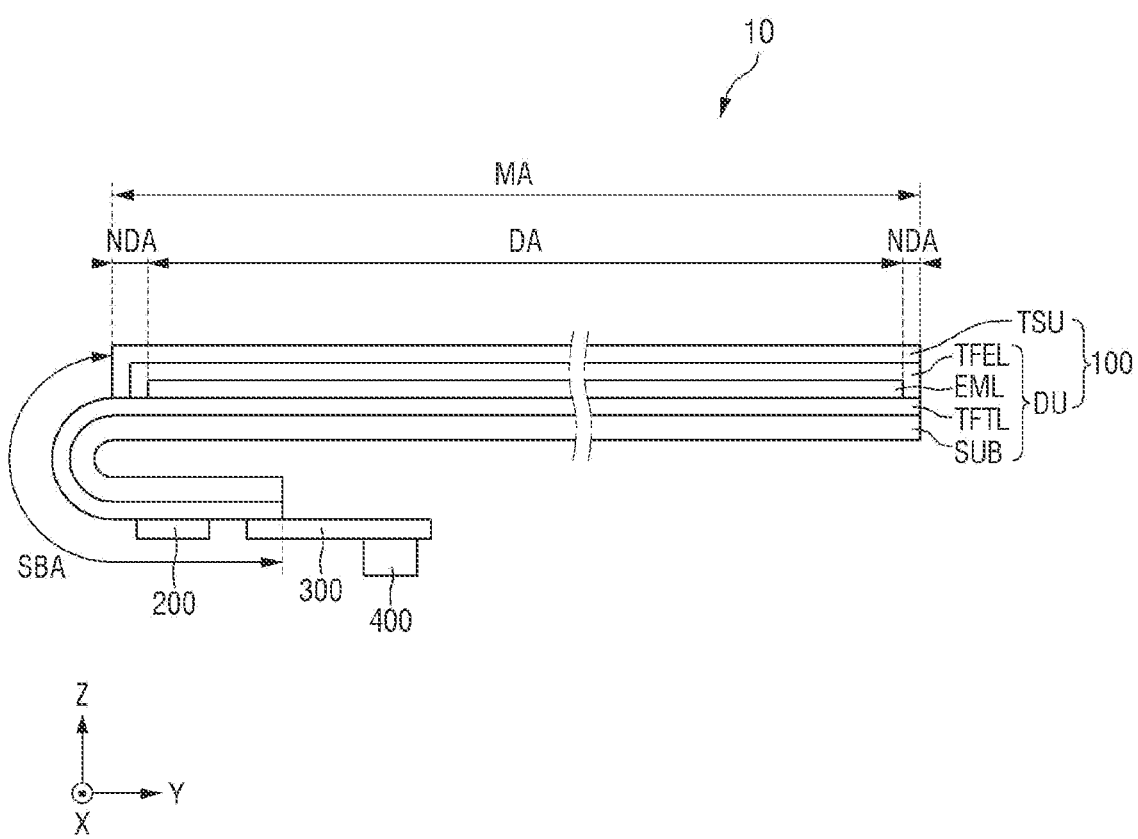
FIG. 2 is a cross-sectional view showing a side of the display device of FIG. 1 in more detail according to some embodiments of the present disclosure.

FIG. 1 is a plan view showing the configuration of a display device according to some embodiments of the present disclosure. FIG. 2 is a cross-sectional view showing a side of the display device of FIG. 1 in more detail according to some embodiments of the present disclosure.

Referring to FIGS. 1 and 2, a display device 10 according to some embodiments may be sorted into a variety of devices depending on the way how images are displayed. For example, the display device 10 may be classified into and implemented as an organic light-emitting display device (OLED), an inorganic light-emitting display device (inorganic EL), a quantum-dot light-emitting display device (QED), a micro LED display device (micro-LED), a nano LED display device (nano-LED), a plasma display device (PDP), a field emission display device (FED), a liquid-crystal display device (LCD), an electrophoretic display device (EPD), etc. In the following description, an organic light-emitting display device (OLED) will be described as an example of the display device. The organic light-emitting display device OLED will be simply referred to as the display device 10 unless it is necessary to distinguish between them. It is, however, to be understood that the embodiments of the present disclosure are not limited to the organic light-emitting display device (OLED), and one of the above-listed display devices or any other display device well known in the art may be employed as the display device 10 without departing from the spirit and scope of embodiments according to the present disclosure.

The display device 10 according to some embodiments may be used as a center information display (CID) located at the instrument cluster, the center fascia or the dashboard of a vehicle, and may also be used as a room mirror display on the behalf of the side mirrors of a vehicle. Electronic devices such as the display device 10 used in vehicles have strict restrictions on the amount of electromagnetic interference (EMI) radiation. Accordingly, a technique for reducing the amount of EMI radiation may be additionally applied to the display device 10 used in vehicles.

The display device 10 according to some embodiments of the present disclosure may be employed by portable electronic devices such as a mobile phone, a smart phone, a tablet PC, a mobile communications terminal, an electronic notebook, an electronic book, a portable multimedia player (PMP), a navigation device and an ultra mobile PC (UMPC). For example, the display device 10 may be used as a display unit of a television, a laptop computer, a monitor, an electronic billboard, or the Internet of Things (IOT). For another example, the display device 10 may be applied to wearable devices such as a smart watch, a watch phone, a glasses-type display, and a head-mounted display (HMD) device.

According to some embodiments of the present disclosure, the display device 10 may have one of a rectangular shape, a square shape, a circular shape, and an elliptical shape when viewed from the top. For example, when the display device 10 is used in a vehicle, it may have a rectangular shape in which the longer sides are located in the horizontal direction. It should be understood, however, that the present disclosure is not limited thereto. The display device 10 may have a rectangular shape in which the longer sides are located in the vertical direction. Alternatively, the display device 10 may be installed rotatably so that the longer sides are located in the horizontal or vertical direction variably. According to some embodiments, the display device 10 may have squared or curved corners or squared or curved edges.

As shown in FIGS. 1 and 2, the display device 10 includes a touch sensing module. The touch sensing module includes a touch sensing unit TSU located on the front surface of the display panel 100, and a touch driver circuit 400 for generating touch position coordinate data of the touch sensing unit TSU.

For example, the display panel 100 of the display device 10 may include a display unit DU displaying images, and a touch sensing unit TSU is located on the display panel 100 to sense a touch by a touch input device such as a part of a human body, e.g., a finger and an electronic pen (or stylus). The display unit DU of the display panel 100 may include a plurality of pixels and may display images through the plurality of pixels. Each pixel may include red, green and blue sub-pixels, or red, green, blue and white sub-pixels.

The touch sensing unit TSU may be mounted on the front surface of the display panel 100 or formed integrally with the display panel 100. The touch sensing unit TSU may include a plurality of touch electrodes configured to enable sensing of a user's touch by capacitive sensing using the touch electrodes. The elements and structural features of the touch sensing unit TSU will be described in more detail later with reference to the accompanying drawings.

The display driver circuit 200 may output signals and voltages for driving pixels in the display unit DU, i.e., each of the sub-pixels. The display driver circuit 200 may supply data voltages to data lines connected to the sub-pixels. The display driver circuit 200 may apply a supply voltage to a voltage line and may supply gate control signals to a gate driver 210. It should be noted that the display driver circuit 200 may be divided into a display driver circuit 200 performing a timing control function and a data driver supplying data voltages to data lines. In such case, the display driver circuit 200 may supply a timing control signal to the gate driver 210 and the data driver to control driving timings of the gate driver 210 and the data driver.

The display driver circuit 200 may be implemented as an integrated circuit (IC) and may be attached on the display panel 100 by a chip-on-glass (COG) technique, a chip-on-plastic (COP) technique, or ultrasonic bonding. For example, the display driver circuit 200 may be located in the subsidiary area SBA and may overlap with the main area MA in the thickness direction (z-axis direction) as the subsidiary area SBA is bent. For another example, the display driver circuit 200 may be mounted on the circuit board 300.

The touch driver circuit 400 may be electrically and physically connected to the touch sensing unit TSU. The touch driver circuit 400 may supply touch driving signals to a plurality of touch electrodes arranged in a matrix in the touch sensing unit TSU and may sense a change in the capacitance between the plurality of touch electrodes. The touch driver circuit 400 may determine whether a user's touch is input and may produce the touch coordinate data based on the amount of the change in the capacitance between the touch electrodes.

The display driver circuit 200 may operate as a main processor or may be formed integrally with the main processor. Accordingly, the display driver circuit 200 may control overall functions of the display device 10. For example, the display driver circuit 200 may receive touch data from the touch driver circuit 400 to determine the user's touch coordinates, and then may generate digital video data based on the touch coordinates. In addition, the display driver circuit 200 may run an application indicated by an icon displayed on the user's touch coordinates. For another example, the display driver circuit 200 may receive coordinate data from an electronic pen to determine the touch coordinates of the electronic pen, and then may generate digital video data according to the touch coordinates or may run an application indicated by an icon displayed at the touch coordinates of the electronic pen.

Referring to FIG. 2, the display panel 100 may be divided into a main area MA and a subsidiary area SBA. The main area MA may include a display area DA where the sub-pixels for displaying images are located, and a non-display area NDA located around the display area DA. In the display area DA, light may be emitted from an emission area or an opening area of each sub-pixel to display an image. To this end, each of the sub-pixels in the display device DA may include a pixel circuit including switching elements, a pixel-defining layer that defines the emission area or the opening area, and a self-light-emitting element.

The non-display area NDA may be the peripheral area, i.e., the outer area of the display area DA. The non-display area NDA may be defined as the edge area of the main area MA of the display panel 100. The non-display area NDA may include a gate driver that applies gate signals to gate lines, and fan-out lines that connect the display driver circuit 200 with the display area DA.

The subsidiary area SBA may be extended from one side of the main area MA. The subsidiary area SUB may include a flexible material that can be bent, folded, or rolled. For example, when the subsidiary area SBA is bent, the subsidiary area SBA may overlap the main area MA in the thickness direction (z-axis direction). The subsidiary area SBA may include pads connected to the display driver circuit 200 and the circuit board 300. Optionally, the subsidiary area SBA may be eliminated, and the display driver circuit 200 and the pads may be located in the non-display area NDA.

The circuit board 300 may be attached on the pads of the display panel 100 using an anisotropic conductive film (ACF). Lead lines of the circuit board 300 may be electrically connected to the pads of the display panel 100. The circuit board 300 may be a flexible printed circuit board (FPCB), a printed circuit board (PCB), or a flexible film such as a chip-on-film (COF).

Incidentally, the substrate SUB of the display panel 100 shown in FIG. 2 may be a base substrate or a base member. The substrate SUB may be of a flat type. Alternatively, the substrate SUB may be a flexible substrate that can be bent, folded, or rolled. For example, the substrate SUB may include, but is not limited to, a glass material or a metal material. As another example, the substrate SUB may include a polymer resin such as polyimide PI.

The thin-film transistor layer TFTL may be located on the substrate SUB. The thin-film transistor layer TFTL may include a plurality of thin-film transistors forming pixel circuits of the sub-pixels SP. The thin-film transistor layer TFTL may include gate lines, data lines, voltage lines, gate control lines, fan-out lines for connecting the display driver circuit 200 with the data lines, lead lines for connecting the display driver circuit 200 with the pads, etc. When the gate driver 210 is formed on one side of the non-display area NDA of the display panel 100, the gate driver 210 may include thin-film transistors.

The thin-film transistor layer TFTL may be located in the display area DA, the non-display area NDA and the subsidiary area SBA. The thin-film transistors in each of the pixels, the gate lines, the data lines and the voltage lines in the thin-film transistor layer TFTL may be located in the display area DA. The gate control lines and the fan-out lines in the thin-film transistor layer TFTL may be located in the non-display area NDA. The lead lines of the thin-film transistor layer TFTL may be located in the subsidiary area SBA.

The emission material layer EML may be located on the thin-film transistor layer TFTL. The emission material layer EML may include a plurality of light-emitting elements in each of which a first electrode, an emissive layer and a second electrode are stacked on one another sequentially to emit light, and a pixel-defining layer for defining each of the sub-pixels. Light-emitting elements of the emission material layer EML may be located in the display area DA.

An encapsulation layer TFEL may cover the upper and side surfaces of the emission material layer EML, and can protect the emission material layer EML. The encapsulation layer TFEL may include at least one inorganic layer and at least one organic layer for encapsulating the emission material layer EML.

The touch sensing unit TSU may be located on the encapsulation layer TFEL of the display panel 100. The touch sensing unit TSU may include a plurality of first touch electrodes for sensing a user's touch by capacitive sensing, and touch driving lines connecting the plurality of first touch electrodes with the touch driver circuit 400. The first touch electrodes of the touch sensing unit TSU may be arranged in a matrix to sense a user's touch by self-capacitance sensing or mutual capacitance sensing.

Second touch electrodes associated with the first touch electrodes are formed and located on the rear side of the first touch electrodes with a touch insulating layer interposed therebetween. The first touch electrodes and the second touch electrodes may be associated with each other with the touch insulating layer therebetween and may overlap each other. For example, the second touch electrodes may be formed on the encapsulation layer TFEL, and a touch insulating layer may be formed on the front side of the second touch electrodes. Accordingly, the first touch electrodes may be located on the front surfaces of the second touch electrodes with the touch insulating formed therebetween.

The second touch electrodes located on the rear side of the first touch electrodes may be electrically connected to the first touch electrodes on the front side by a plurality of driving switching circuits, respectively, or may be connected to a low-level voltage source such as a ground and a ground voltage source.

For example, the second touch electrodes may be electrically connected to a low-level voltage source by a plurality of driving switching circuits during a non-touch sensing period in which there is no user's touch. As described above, the second touch electrodes connected to the low-level voltage source form a capacitor with the first touch electrodes on the rear side of the first touch electrodes with the touch insulating layer interposed therebetween, thereby reducing EMI and the amount of EMI radiation generated from the first touch electrodes.

On the other hand, the second touch electrodes may be electrically connected to the respective first touch electrodes by the driving switching circuits during a touch sensing period in which there is a user's touch. The second touch electrodes may be respectively connected to the first touch electrodes in parallel to sense a user's touch by capacitive sensing like the first touch electrodes.

The touch sensing unit TSU may not be formed integrally with the display panel 100 but may be located on a separate substrate or film located on the display unit DU of the display panel 100. In such case, the substrate of the film supporting the touch sensing unit TSU may be a base member encapsulating the display unit DU.

The plurality of touch electrodes included the touch sensing unit TSU may be located in a touch sensor area overlapping the display area DA. The touch lines of the touch sensing unit TSU may be located in a touch peripheral area overlapping the non-display area NDA.

The touch driver circuit 400 may be mounted on a separate circuit board. The touch driver circuit 400 may be implemented as an integrated circuit (IC).

The touch driver circuit 400 supplies the touch driving signals to the first touch electrodes of the touch sensing unit TSU during the non-touch sensing period as well as the touch sensing period, and measures the amount of a change in mutual capacitance of each of a plurality of first touch nodes formed by the first touch electrodes.

Specifically, during the non-touch sensing period, the touch driver circuit 400 controls the driving switching circuits so that the second touch electrodes are electrically separated from the first touch electrodes and all of the second touch electrodes are connected to the low-level voltage source. Accordingly, during the non-touch sensing period, touch driving signals may be supplied only to the first touch electrodes, and a touch sensing signal may be output through the first touch electrodes based on a change in the capacitance of the first touch nodes. At this time, the EMI generated in the first touch electrodes by the touch driving signals may flow to the low-level voltage source by the second touch electrodes connected to the low-level voltage source and may be reduced.

On the other hand, during the touch sensing period in which a touch is sensed, the touch driver circuit 400 uses the plurality of driving switching circuits to disconnect the second touch electrodes from the low-level voltage source and electrically connect them with the first touch electrodes. Accordingly, the first and second touch electrodes are connected in parallel between a touch driving signal input terminal and a touch sensing signal output terminal. The touch driving signals are simultaneously supplied to the first and second touch electrodes, and a touch sensing signal may be output through the first touch electrodes depending on a change in the capacitance of the first touch nodes formed by the first touch electrodes and the second touch nodes formed by the second touch electrodes.

The touch driver circuit 400 measures a change in the capacitance of the first and second touch nodes based on a change in a voltage level or the amount of the current of a touch sensing signal received through the first and second touch electrodes connected in parallel. In this manner, the touch driver circuit 400 may determine whether the position of a user's touch based on the amount of a change in the mutual capacitance of each of the first and second touch nodes. The touch driving signal may be a pulse signal having a predetermined frequency. The touch driver circuit 400 may determine whether there is a touch by a touch input means or a part of a user's body such as a finger and may find the coordinates of the touch, if any, based on the amount of the change in the capacitance between the touch electrodes.

Figure 3:
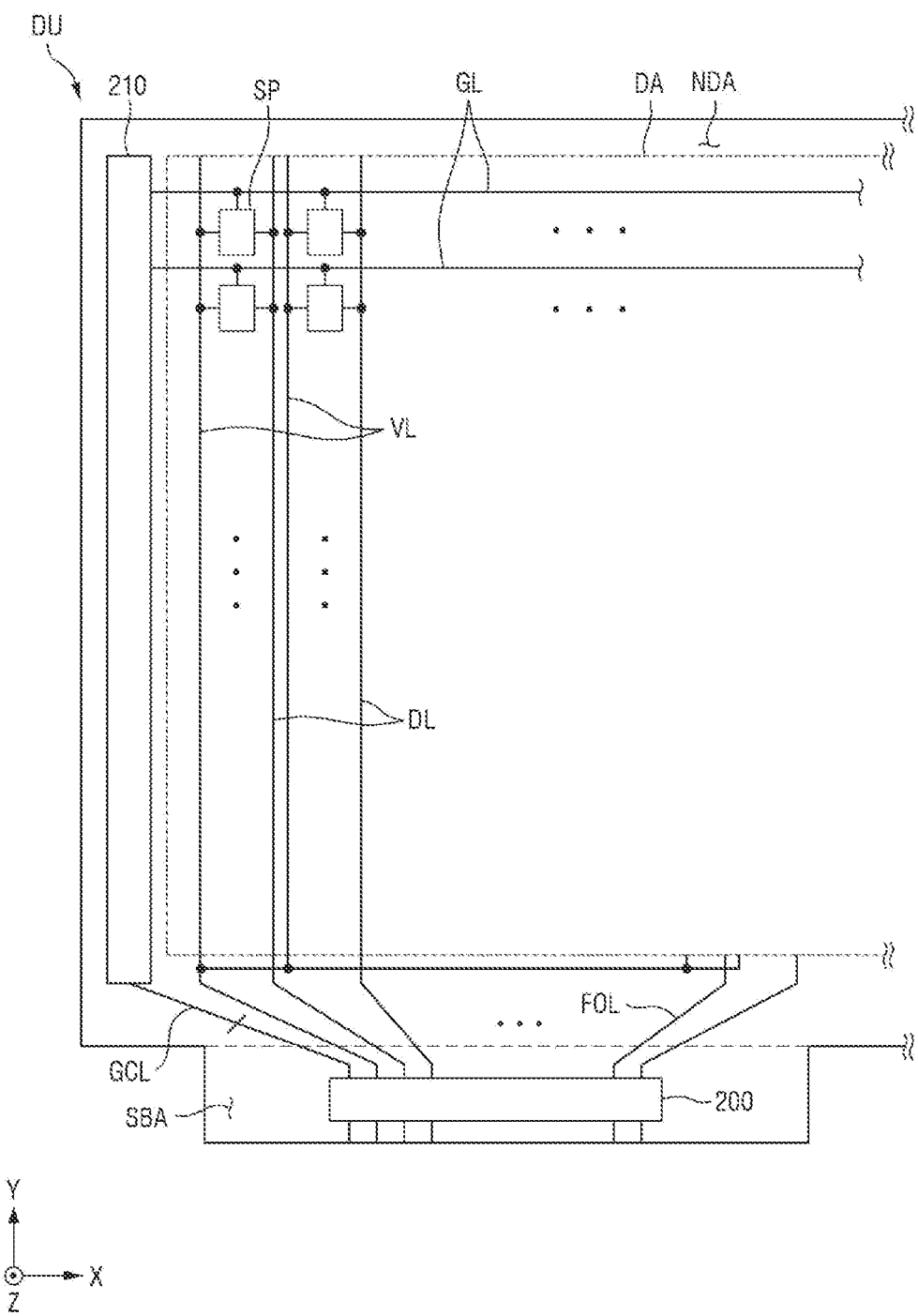
FIG. 3 is a view showing an example of a layout of a display panel according to some embodiments of the present disclosure.

FIG. 3 is a view showing an example of a layout of a display panel according to some embodiments of the present disclosure. Specifically, FIG. 3 is a layout view showing the display area DA and the non-display area NDA of the display unit DU before the touch sensing unit TSU is formed.

The display area DA displays images therein and may be defined as a central area of the display panel 100. The display area DA may include a plurality of sub-pixels SP, a plurality of gate lines GL, a plurality of data lines DL, a plurality of voltage lines VL, etc. Each of the plurality of sub-pixels SP may be defined as the minimum unit that outputs light.

The plurality of gate lines GL may supply the gate signals received from the gate driver 210 to the plurality of sub-pixels SP. The plurality of gate lines GL may be extended in the x-axis direction and may be spaced apart from one another in the y-axis direction crossing the x-axis direction.

The plurality of data lines DL may supply the data voltages received from the display driver circuit 200 to the plurality of sub-pixels SP. The plurality of data lines DL may be extended in the y-axis direction and may be spaced apart from one another in the x-axis direction.

The plurality of voltage lines VL may supply the supply voltage received from the display driver circuit 200 to the plurality of pixels SP. The supply voltage may be at least one of a driving voltage, an initialization voltage, and a reference voltage. The plurality of voltage lines VL may be extended in the y-axis direction and may be spaced apart from one another in the x-axis direction.

The non-display area NDA may surround the display area DA. The non-display area NDA may include the gate driver 210, fan-out lines FOL, and gate control lines GCL. The gate driver 210 may generate a plurality of gate signals based on the gate control signal, and may sequentially supply the plurality of gate signals to the plurality of gate lines GL in a predetermined order.

The fan-out lines FOL may be extended from the display driver circuit 200 to the display area DA. The fan-out lines FOL may supply the data voltage received from the display driver circuit 200 to the plurality of data lines DL.

The gate control line GCL may be extended from the display driver circuit 200 to the gate driver 210. The gate control line GCL may supply the gate control signal received from the display driver circuit 200 to the gate driver 210.

The display driver circuit 200 may output signals and voltages for driving the display panel 100 to the fan-out lines FOL. The display driver circuit 200 may supply data voltages to the data lines DL through the fan-out lines FOL. The data voltages may be applied to the plurality of sub-pixels SP, so that the luminance of the plurality of sub-pixels SP may be determined. The display driver circuit 200 may supply a gate control signal to the gate driver 210 through the gate control line GCL.

Figure 4:
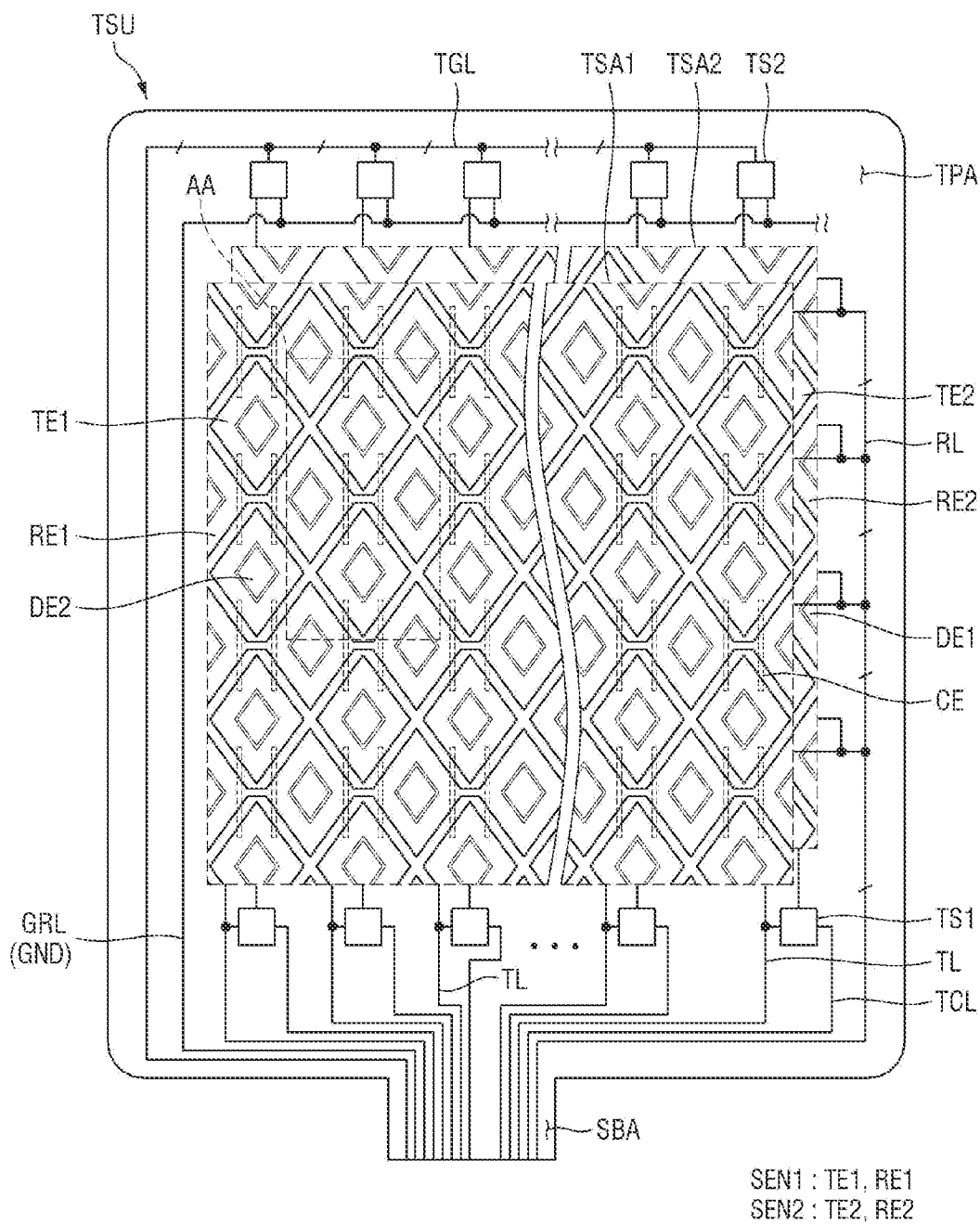
FIG. 4 is a view showing an example of a layout of a touch sensing module according to some embodiments of the present disclosure.

FIG. 4 is a view showing an example of a layout of a touch sensing module according to some embodiments of the present disclosure.

FIG. 4 illustrates an example of a structure in which first touch electrodes SEN1 and second touch electrodes SEN2 overlap each other as a double layer with a touch insulating film therebetween in the main area MA. The first touch electrodes SEN1 may include two types of electrodes, for example, first driving electrodes TE1 and first sensing electrodes RE1. The second touch electrodes SEN2 may include two types of electrodes, for example, second driving electrodes TE2 and second sensing electrodes RE2. Accordingly, during the non-touch sensing period, the first touch electrodes SEN1 and the second touch electrodes SEN2 may be electrically separated, a touch driving signal is applied to the first driving electrodes TE1, and then the amount of change of the mutual capacitance of each of the plurality of touch nodes may be sensed through the first sensing electrodes RE1. Therefore, during the touch sensing period, the first and second touch electrodes SEN1 and SEN2 are connected in parallel, the touch driving signal is applied to the first and second driving electrodes TE1 and TE2, and then the amount of a charge in the mutual capacitance of each of the plurality of first and second touch nodes may be sensed through the first and second sensing electrodes RE1 and RE2.

For convenience of illustration, FIG. 4 shows only some of the first touch electrodes SEN1 including the first driving electrodes TE1 and the first sensing electrodes RE1, first dummy electrodes DE1, second touch electrodes SEN2 including the second driving electrodes TE2 and the second sensing electrodes RE2, and touch lines TL and RL.

The main area MA of the touch sensing unit TSU includes a first touch sensing layer TSA1 in which first touch electrodes SEN1 sensing a user's touch and first dummy electrodes DE1 are located, and optionally a second touch sensing layer TSA2 in which second touch electrodes SEN2 for reducing the amount of EMI radiation or sensing a user's touch and second dummy electrodes DE2 are located.

The touch sensing unit TSU includes a touch peripheral area TPA around the first and second touch sensing layers TSA1 and TSA2. The first and second touch sensing area TSA1 and TSA2 may overlap the display area DA of FIGS. 1 to 3, and the touch peripheral area TPA may overlap the non-display area NDA.

First driving electrodes TE1, first sensing electrodes RE1 and first dummy electrodes DE1 are located in the first touch sensing layer TSA1. The first driving electrodes TE1 and the first sensing electrodes RE1 may form mutual capacitance to sense a touch by a touch input means or a part of the body.

The first driving electrodes TE1 may be arranged side-by-side in the x-axis direction and the y-axis direction. The first driving electrodes TE1 adjacent to one another in the y-axis direction may be electrically separated from one another. The first driving electrodes TE1 adjacent to one another in the y-axis direction may be electrically connected with one another. The first driving electrodes TE1 adjacent to one another in the y-axis direction may be connected through separate connection electrodes CE.

The first sensing electrodes RE1 may be arranged side-by-side in the x-axis direction and the y-axis direction. The first sensing electrodes RE1 may be electrically connected with one another in the x-axis direction. The first sensing electrodes adjacent to one another in the x-axis direction may be connected with one another. In addition, the first sensing electrodes RE1 adjacent to one another in the y-axis direction may be electrically isolated from one another. Accordingly, a first touch node where a mutual capacitance is formed may be located at each of intersections of the first driving electrodes TE1 and the first sensing electrodes RE1. A plurality of first touch nodes may be associated with intersections of the first driving electrodes TE1 and the first sensing electrodes RE1.

Each of the first dummy electrodes DE1 may be surrounded by the first driving electrode TE1 or the first sensing electrode RE1. Each of the first dummy electrodes DE1 may be electrically isolated from the first driving electrode TE1 or the first sensing electrode RE1. Each of the first dummy electrodes DE1 may be spaced apart from the first driving electrode TE1 or the first sensing electrode RE1. Each of the first dummy electrodes DE1 may be electrically floating.

The second driving electrodes TE2, the second sensing electrodes RE2 and the second dummy electrodes DE2 are located in the second touch sensing layer TSA2, which is the rear layer of the first touch sensing layer TSA1. The second driving electrodes TE2 and the second sensing electrodes RE2 may form mutual capacitance to sense a touch by a touch input means or a part of the body.

The second driving electrodes TE2 are located on the rear side of the first driving electrodes TE1 so that they are associated with the first driving electrodes TE1 with a touch insulating layer therebetween. The first and second driving electrodes TE1 and TE2 may be arranged such that they are parallel to each other or face each other. Like the first driving electrodes TE1, the second driving electrodes TE2 may be arranged side-by-side in the x-axis direction and the t-axis direction. The second driving electrodes TE2 adjacent to one another in the x-axis direction may be electrically separated from one another. The second driving electrodes TE2 adjacent to one another in the y-axis direction may be electrically connected with one another. The second driving electrodes TE2 adjacent to one another in the y-axis direction may be connected through separate connection electrodes CE.

The second sensing electrodes RE2 are located on the rear side of the first sensing electrodes RE1 so that they are associated with the first sensing electrodes RE1 with a touch insulating layer therebetween. The first and second sensing electrodes RE1 and RE2 may be arranged such that they are parallel to each other or face each other.

Like the first sensing electrodes RE1, the second sensing electrodes RE2 may be arranged side-by-side in the x-axis direction and the t-axis direction. The second sensing electrodes RE2 may be electrically connected with one another in the x-axis direction. That is to say, the second sensing electrodes adjacent to one another in the x-axis direction may be connected with one another. In addition, the second sensing electrodes RE2 adjacent to one another in the y-axis direction may be electrically isolated from one another. Accordingly, a second touch node where a mutual capacitance is formed may be located at each of intersections of the second driving electrodes TE2 and the second sensing electrodes RE2. A plurality of second touch nodes may be associated with intersections of the second driving electrodes TE2 and the second sensing electrodes RE2.

The second sensing electrodes RE2 connected with one another in the x-axis direction in the second touch sensing layer TSA2 may be electrically connected to the first sensing electrodes RE1 connected with one another in the x-axis direction in the first touch sensing layer TSA1 on the front side, respectively. The first sensing electrodes RE1 and the second sensing electrodes RE2 may be electrically connected through at least one contact hole or may be electrically connected through a connection line on one side or the opposite side.

Each of the second dummy electrodes DE2 may be surrounded by the second driving electrode TE2 or the second sensing electrode RE2. Each of the second dummy electrodes DE2 may be electrically isolated from the second driving electrode TE2 or the second sensing electrode RE1 and may be electrically floating. Although each of the first and second driving electrodes TE1 and TE2, the first and second sensing electrodes RE1 and RE2, and the first and second dummy electrodes DE1 and DE2 has a diamond shape when viewed from the top in FIG. 4, the present disclosure is not limited thereto. For example, each of the first and second driving electrodes TE1 and TE2, the first and second sensing electrodes RE1 and RE2, and the first and second dummy electrodes DE1 and DE2 may have other quadrangular shape than a diamond, other polygonal shapes than a quadrangular shape, a circle shape or an ellipse shape when viewed from the top The touch lines TL and RL may be located in a sensor peripheral area TPA. The touch lines TL and RL include touch driving lines TL respectively connected to the first driving electrodes TE1, and touch sensing lines RL respectively connected to the first sensing electrodes RE1.

The first sensing electrodes RE1 located at one end of the first touch sensing layer TSA1 may be connected with the touch sensing lines RL, respectively. For example, as shown in FIG. 4, the first sensing electrodes RE1 located at the right end among the first sensing electrodes RE1 electrically connected in the x-axis direction may be connected to the touch sensing lines RL, respectively. Each of the touch sensing lines RL may be electrically connected to the touch driver circuit 400 through separate pads.

The first driving electrodes TE1 located at one end of the first touch sensing layer TSA1 may be connected with the touch driving lines TL, respectively. For example, among the first driving electrodes TE1 electrically connected in the y-axis direction, the first driving electrodes TE1 located at the lower end in the y-axis direction may be connected to the touch driving lines TL, respectively. The touch driving lines TL may be electrically connected to the touch driver circuit 400 through separate pads.

In the touch peripheral area TPA, driving switching circuits TS1 and TS2 may be located, which electrically connect the second driving electrodes TE2 arranged in the y-axis direction in the second touch sensing layer TSA2 with the first driving electrodes TE1 of the first touch sensing layer TSA1, respectively, or electrically connect the second driving electrodes TE2 with the low-level voltage source GND.

Specifically, the driving switching circuits TS1 and TS2 are divided into first driving switching circuits TS1 and second driving switching circuits TS2.

In response to a first switching control signal from the touch driver circuit 400, the first driving switching circuits TS1 electrically connect/disconnect the second driving electrodes TE2 connected in the y-axis direction in the second touch sensing layer TSA2 to/from the first driving electrodes TE1 located in the first touch sensing layer TSA1 on the front side, respectively.

The first driving switching circuits TS1 may be located on one side of the first and second driving electrodes TE1 and TE2 overlapping each other. The first driving switching circuits TS1 are turned on by the first switching control signal input through the first switching signal lines TCL to electrically connect the second driving electrodes TE2 to the touch driving lines TL or the respective first driving electrodes TE1 in the first touch sensing layer TSA1. On the other hand, the first driving switching circuits TS1 are turned off by the first switching control signal to separate the second driving electrodes TE2 from the touch driving lines TL or the first driving electrodes TE1. The touch driver circuit 400 supplies the first switching control signal of the turn-on level to the first switching signal lines TCL so that the first driving switching circuits TS1 are turned on during the touch sensing period in which a touch is sensed. During the non-touch sensing period, the first switching control signal of a turn-off level may be supplied to the first switching signal lines TCL so that the first driving switching circuits TS1 are turned off.

The second driving switching circuits TS2 electrically connect or disconnect the second driving electrodes TE2 connected in the y-axis direction in the second touch sensing layer TSA2 to or from the low-level voltage source GND in response to the second switching control signal from the touch driver circuit 400.

The second driving switching circuits TS2 may be located on the opposite side of the first and second driving electrodes TE1 and TE2 overlapping each other. The second driving switching circuits TS2 are turned on by the second switching control signal input through second switching signal lines TGL to electrically connect the second driving electrodes TE2 to a low-level line GRL connected to the low-level voltage source GND. On the other hand, the second driving switching circuits TS2 may be turned off by the second switching control signal to separate each of the second driving electrodes TE2 from the low-level line GRL.

The touch driver circuit 400 supplies the second switching control signal of the turn-off level to the second switching signal lines TGL so that the second driving switching circuits TS2 are turned off during the touch sensing period. In addition, during the non-touch sensing period, the second switching control signal of the turn-on level may be supplied to the second switching signal lines TGL so that the second driving switching circuits TS2 are turned on.

Figure 5:
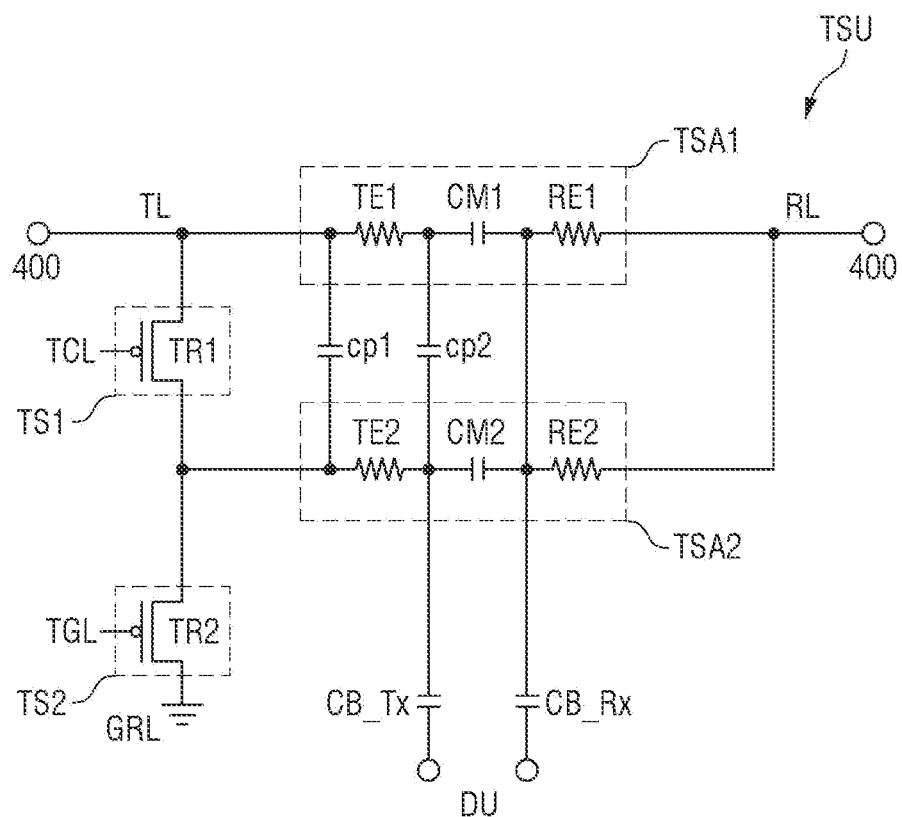
FIG. 5 is a circuit diagram specifically showing one first touch electrode, one second touch electrode, a driving switching circuit, and a sensing switching circuit shown in FIG. 4 according to some embodiments of the present disclosure.

FIG. 5 is a circuit diagram specifically showing one first touch electrode, one second touch electrode, a driving switching circuit, and a sensing switching circuit shown in FIG. 4.

Referring to FIG. 5, the first touch electrodes SEN1 of the first touch sensing layer TSA1, i.e., the first sensing electrodes RE1 as well as the first driving electrodes TE1 overlap with the second touch electrodes SEN2 of the second touch sensing layer TSA2 located on the rear side, i.e., the second driving electrodes TE2 and the second sensing electrodes RE2.

A plurality of parasitic capacitors cp1 and cp2 may be formed between the first touch electrodes SEN1 and the second touch electrodes SEN2 as the first touch electrodes SEN1 and the second touch electrodes SEN2 are electrically connected in parallel. In addition, load capacitors CB_Tx and CB_Rx may be formed at some locations between the second touch electrodes SEN2 of the second touch sensing layer TSA2 and the sub-pixels SP of the display unit DU.

A first touch node CM1 where a mutual capacitance is formed may be defined at each of intersections of the first driving electrodes TE1 and the first sensing electrodes RE1 of the first touch sensing layer TSA1. Likewise, a second touch node CM2 where a mutual capacitance is formed may be defined at each of intersections of the second driving electrodes TE2 and the second sensing electrodes RE2 of the second touch sensing layer TSA2.

In response to a first switching control signal input through the first switching signal line TCL, the first driving switching circuits TS1 may include at least one first switching element TR1 that electrically connects/disconnects the second driving electrodes TE2 to/from the first driving electrodes TE1 on the front side. The first switching element TR1 is turned on by the first switching control signal of the gate-on voltage level applied during the touch sensing period to electrically connect the second driving electrode TE2 with the touch driving line TL or the first driving electrode TE1. In addition, the first switching element TR1 is turned off by the first switching control signal of the gate-off voltage level applied during the non-touch sensing period to electrically separate the second driving electrode TE2 from the touch driving line TL or the first driving electrode TE1.

The second driving switching circuits TS2 may include at least one second switching element TR2 that electrically connects/disconnects the second driving electrodes TE2 to/from the low-level line GRL connected to the low-level voltage source GND in response to a second switching control signal input through the second switching signal line TGL. The second switching element TR2 is turned off by the second switching control signal of the gate-off voltage level applied during the touch sensing period to electrically disconnect the second driving electrode TE2 from the low-level line GRL. In addition, the second switching element TR2 may be turned on by the second switching control signal of the gate-on voltage level applied during the non-touch sensing period to electrically connect the second driving electrode TE2 with the low-level line GRL.

Figure 6:
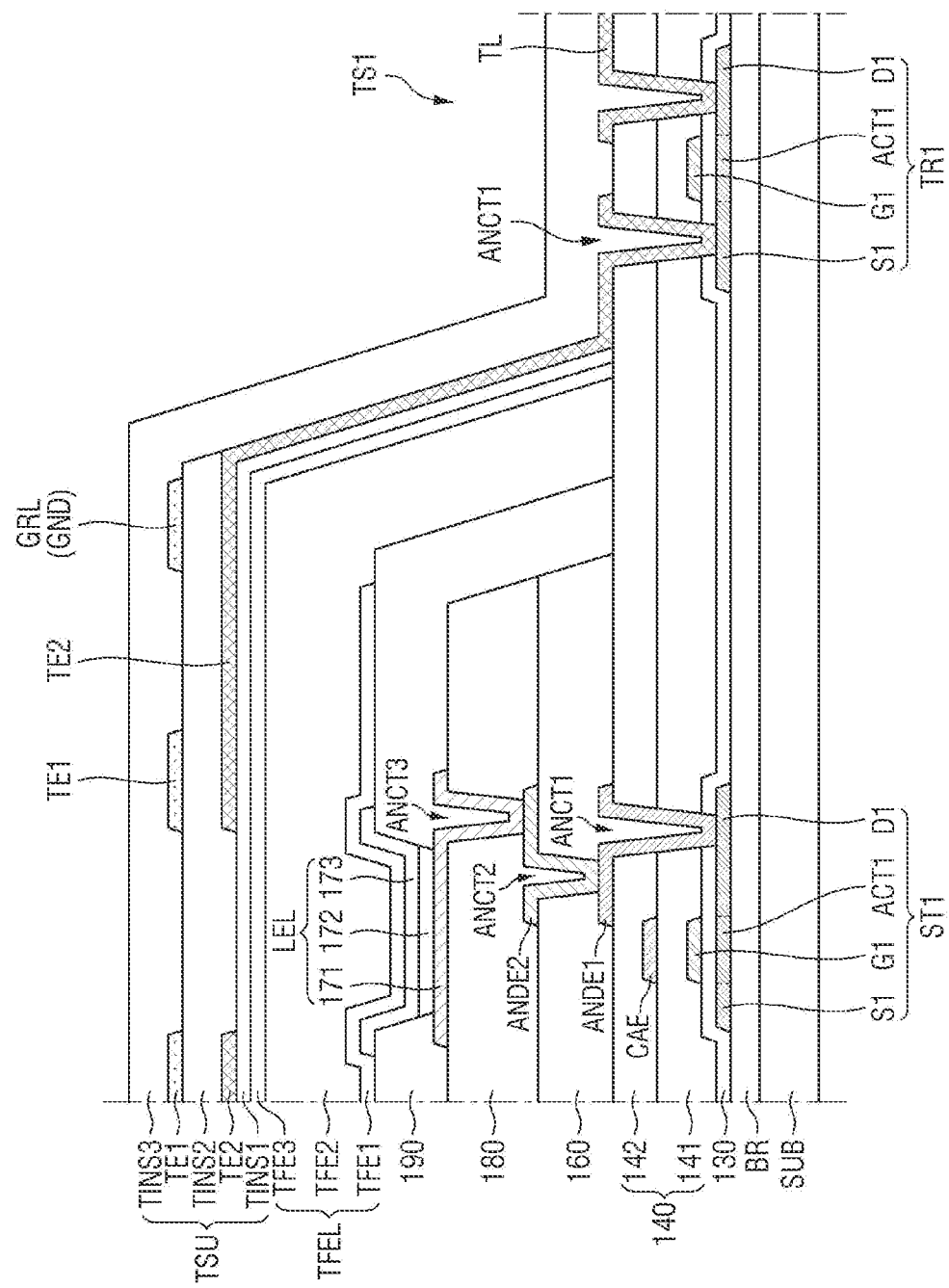
FIG. 6 is a cross-sectional view showing a cross-sectional structure of a sub-pixel in a display area, first and second touch sensing layers overlapping the display area, and one of the first switching elements formed in the non-display area according to some embodiments of the present disclosure.

FIG. 6 is a cross-sectional view showing a cross-sectional structure of a sub-pixel in a display area, first and second touch sensing layers overlapping the display area, and one of the first switching elements formed in the non-display area.

Referring to FIG. 6, a barrier layer BR may be located on the substrate SUB before the sub-pixels in the display area DA and the first switching elements TR1 in the non-display area NDA are formed. The substrate SUB may be made of an insulating material such as a polymer resin. For example, the substrate SUB may be made of polyimide, glass or the like. The substrate SUB may be a flexible substrate that can be bent, folded, or rolled. Alternatively, the substrate SUB may be of a flat type.

The barrier layer BR is a layer for protecting the thin-film transistors of the thin-film transistor layer TFTL and an emissive layer 172 of the emission material layer EML. The barrier layer BR may be formed of multiple inorganic layers stacked on one another alternately. For example, the barrier layer BR may be made up of multiple layers in which one or more inorganic layers of a silicon nitride layer, a silicon oxynitride layer, a silicon oxide layer, a titanium oxide layer and an aluminum oxide layer are alternately stacked on one another.

Thin-film transistors ST1 are located on the barrier layer BR where the sub-pixels are formed. In addition, first to fourth switching elements TR1 to TR4 are located in the non-display area NDA. The first switching element TR1 is located in the non-display area NDA shown in FIG. 6.

Each of the thin-film transistors ST1 and the first to fourth switching elements TR1 to TR4 of the non-display area NDA includes an active layer ACT1, a gate electrode G1, a source electrode S1 and a drain electrode D1. For convenience of illustration, the thin-film transistors ST1 of the same process as the first switching element TR1 shown in FIG. 6 will be described.

The active layer ACT1, the source electrode S1 and the drain electrode D1 of each of the thin-film transistors ST1 may be located on the barrier layer BR on which the sub-pixels are formed. The active layer ACT1 of each of the thin-film transistors ST1 includes at least one of polycrystalline silicon, single crystalline silicon, low-temperature polycrystalline silicon, amorphous silicon, and an oxide semiconductor. A part of the active layer ACT1 overlapping the gate electrode G1 in the third direction (z-axis direction) that is the thickness direction of the substrate SUB may be defined as a channel region. The source electrode S1 and the drain electrode D1 are regions that do not overlap with the gate electrode G1 in the third direction (z-axis direction), and may have conductivity by doping ions or impurities into a silicon semiconductor or an oxide semiconductor.

A gate insulator 130 may be located on the active layer ACT1, the source electrode S1 and the drain electrode D1 of each of the thin-film transistors ST1. The gate insulator 130 may be formed of an inorganic layer, for example, a silicon nitride layer, a silicon oxynitride layer, a silicon oxide layer, a titanium oxide layer, or an aluminum oxide layer.

The gate electrode G1 of each of the thin-film transistors ST1 may be located on the gate insulator 130. The gate electrode G1 may overlap the active layer ACT1 in the third direction (z-axis direction). The gate electrode G1 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A first interlayer dielectric layer 141 may be located on the gate electrode G1 of each of the thin-film transistors ST1. The first interlayer dielectric layer 141 may be formed of an inorganic layer, for example, a silicon nitride layer, a silicon oxynitride layer, a silicon oxide layer, a titanium oxide layer, or an aluminum oxide layer. The first interlayer dielectric layer 141 may be made of a plurality of inorganic layers.

A capacitor electrode CAE may be located on the first interlayer dielectric layer 141. The capacitor electrode CAE may overlap the gate electrode G1 of the first thin-film transistor ST1 in the third direction (z-axis direction). Since the first interlayer dielectric layer 141 has a predetermined dielectric constant, a capacitor can be formed by the capacitor electrode CAE, the gate electrode G1, and the first interlayer dielectric layer 141 located between them. The capacitor electrode CAE may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A second interlayer dielectric layer 142 may be arranged over the capacitor electrode CAE. The second interlayer dielectric layer 142 may be formed of an inorganic layer, for example, a silicon nitride layer, a silicon oxynitride layer, a silicon oxide layer, a titanium oxide layer, or an aluminum oxide layer. The second interlayer dielectric layer 142 may be made of a plurality of inorganic layers.

A first anode connection electrode ANDE1 may be located on the second interlayer dielectric layer 142. The first anode connection electrode ANDE1 may be connected to the drain electrode D1 of the thin-film transistor ST1 through a first connection contact hole ANCT1 that penetrates the gate insulator 130, the first interlayer dielectric layer 141 and the second interlayer dielectric layer 142. The first anode connection electrode ANDE1 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A first planarization layer 160 may be located over the first anode connection electrode ANDE1 for providing a flat surface over level differences due to the thin-film transistor ST1. The first planarization layer 160 may be formed of an organic layer such as an acryl resin, an epoxy resin, a phenolic resin, a polyamide resin and a polyimide resin.

A second anode connection electrode ANDE2 may be located on the first planarization layer 160. The second anode connection electrode ANDE2 may be connected to the first anode connection electrode ANDE1 through a second connection contact hole ANCT2 penetrating the first planarization layer 160. The second anode connection electrode ANDE2 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A second planarization layer 180 may be located on the second anode connection electrode ANDE2. The second planarization layer 180 may be formed as an organic layer such as an acryl resin, an epoxy resin, a phenolic resin, a polyamide resin and a polyimide resin.

Light-emitting elements LEL and a bank 190 may be located on the second planarization layer 180. Each of the light-emitting elements LEL includes a pixel electrode 171, an emissive layer 172, and a common electrode 173.

The pixel electrode 171 may be located on the second planarization layer 180. The pixel electrode 171 may be connected to the second anode connection electrode ANDE2 through a third connection contact hole ANCT3 penetrating the second planarization layer 180.

In the top-emission structure in which light exits from the emissive layer 172 toward the common electrode 173, the pixel electrode 171 may be made of a metal material having a high reflectivity such as a stack structure of aluminum and titanium (Ti/Al/Ti), a stack structure of aluminum and indium tin oxide (ITO) (ITO/Al/ITO), an APC alloy and a stack structure of APC alloy and ITO (ITO/APC/ITO). The APC alloy is an alloy of silver (Ag), palladium (Pd) and copper (Cu).

The bank 190 may partition the pixel electrode 171 on the second planarization layer 180 to define each emission area EA. The bank 190 may be arranged to cover the edges of the pixel electrodes 171. The bank 190 may be formed of an organic layer such as an acryl resin, an epoxy resin, a phenolic resin, a polyamide resin and a polyimide resin. In the emission area, the pixel electrode 171, the emissive layer 172 and the common electrode 173 are stacked on one another sequentially, so that holes from the pixel electrode 171 and electrons from the common electrode 173 are combined with each other in the emissive layer 172 to emit light.

The emissive layer 172 may be located on the pixel electrode 171 and the bank 190. The emissive layer 172 may include an organic material to emit light of a certain color. For example, the emissive layer 172 may include a hole transporting layer, an organic material layer, and an electron transporting layer.

The common electrode 173 may be located on the emissive layer 172. The common electrode 173 may be arranged to cover the emissive layer 172. The common electrode 173 may be a common layer formed commonly across the first emission area, the second emission area, and the third emission area. A capping layer may be formed on the common electrode 173.

In the top-emission organic light-emitting diode, the common electrode 173 may be formed of a transparent conductive material (TCP) such as ITO and IZO that can transmit light, or a semi-transmissive conductive material such as magnesium (Mg), silver (Ag) and an alloy of magnesium (Mg) and silver (Ag). When the common electrode 173 is formed of a semi-transmissive metal material, the light extraction efficiency can be increased by using microcavities.

An encapsulation layer TFEL may be located on the common electrode 173. The encapsulation layer TFEL includes at least one inorganic layer to prevent or reduce permeation of oxygen or moisture into the emission material layer EML. In addition, the encapsulation layer TFEL includes at least one organic layer to protect the light-emitting element layer EML from foreign substances such as dust. For example, the encapsulation layer TFEL includes a first inorganic encapsulation layer TFE1, an organic encapsulation layer TFE2 and a second inorganic encapsulation layer TFE3.

The first inorganic encapsulation layer TFE1 may be located on the common electrode 173, the organic encapsulation layer TFE2 may be located on the first inorganic encapsulation layer TFE1, and the second inorganic encapsulation layer TFE3 may be located on the organic encapsulation layer TFE2. The first inorganic encapsulation layer TFE1 and the second inorganic encapsulation layer TFE3 may be made up of multiple layers in which one or more inorganic layers of a silicon nitride layer, a silicon oxynitride layer, a silicon oxide layer, a titanium oxide layer and an aluminum oxide layer are alternately stacked on one another. The organic encapsulation layer TFE2 may be an organic layer such as an acryl resin, an epoxy resin, a phenolic resin, a polyamide resin, a polyimide resin, etc.

The touch sensing unit TSU may be located on the encapsulation layer TFEL.

The touch sensing unit TSU includes a first touch insulating layer TINS1, second driving electrodes TE2 and the second sensing electrodes RE2 of the second touch sensing layer TSA2, and a second touch insulating layer TINS2, first driving electrodes TE1 and first sensing electrodes RE1 of the first touch sensing layer TSA1. In addition, in the first touch sensing layer TSA1, the first driving electrodes TE1 and the first sensing electrodes RE1 together with a contact line of the first driving electrodes TE1 and the low-level line GRL may be formed.

The first touch insulating layer TINS1 may be formed of an inorganic layer, for example, a silicon nitride layer, a silicon oxynitride layer, a silicon oxide layer, a titanium oxide layer, or an aluminum oxide layer.

The second driving electrodes TE2 and the second sensing electrode RE2 may be located on the first touch insulating layer TINS1. In addition to the second driving electrodes TE2 and the second sensing electrodes RE2, the second dummy electrodes DE2, the touch driving lines TL, the touch sensing lines RL and connection electrodes CE shown in FIG. 4 may be formed. The connection electrodes CE may electrically connect the first driving electrodes TE1 through a plurality of contact holes.

The second driving electrodes TE2, the second sensing electrodes RE2 and the second dummy electrodes DE1 may be implemented as conductive metal electrodes, and may be made of one of molybdenum (Mo), aluminum (Al), chromium (Cr), gold (Au), titanium (Ti), nickel (Ni), neodymium (Nd) and copper (Cu) or an alloy thereof. The second driving electrodes TE2, the second sensing electrodes RE2 and the second dummy electrodes DE2 are formed in a mesh structure or a net structure so that they do not overlap with the emission areas. Each of the second driving electrodes TE2 and the second sensing electrodes RE2 may overlap with some of the connection electrodes CE in the z-axis direction.

The second touch insulating layer TINS2 may be formed on the first touch insulating layer TINS1 including the second driving electrodes TE2 and the second sensing electrodes RE2. The second touch insulating layer TINS2 may provide a flat surface over the second driving electrodes TE2, the second sensing electrodes RE2 and the connection electrodes CE which have different heights. To this end, the second touch insulating layer TINS2 may be formed of an inorganic layer, i.e., a silicon nitride layer, a silicon oxynitride layer, a silicon oxide layer, a titanium oxide layer, or an aluminum oxide layer. Alternatively, the second touch insulating layer TINS2 may be formed of an organic layer such as an acryl resin, an epoxy resin, a phenolic resin, a polyamide resin and a polyimide resin.

On the second touch insulating layer TINS2, the first driving electrodes TE1, the first sensing electrodes RE1, the first dummy electrodes DE1, a contact line of the first driving electrodes TE1 and the low-level lines GRL may be formed.

A third touch insulating layer TINS3 may be further formed as a planarization layer and a protective layer on the second touch insulating layer TINS2 including the first driving electrodes TE1, the first sensing electrode RE1, the contact line, etc. The third touch insulating layer TINS3 may be formed of an inorganic layer, i.e., a silicon nitride layer, a silicon oxynitride layer, a silicon oxide layer, a titanium oxide layer, or an aluminum oxide layer.

The first switching elements TR1 and the second switching elements TR2 are formed in the touch peripheral area TPA. For example, the first switching elements TR1 receive the first switching control signal input through the first switching signal line TCL formed in the touch peripheral area TPA at the gate electrode G1. And, it is turned on or turned off by the first switching control signal to electrically connect/separate the second driving electrode TE2 to/from the touch driving line TL or the first driving electrode TE1. To this end, the drain or source electrodes S1 of the first switching elements TR1 may be extended toward the second driving electrodes TE2 to be electrically connected to the second driving electrodes TE2 through a first signal contact hole ANCT1. On the other hand, the source or drain electrodes D1 of the first switching elements TR1 may be electrically connected to the touch driving line TL or the first driving electrode TE1.

Figure 7:
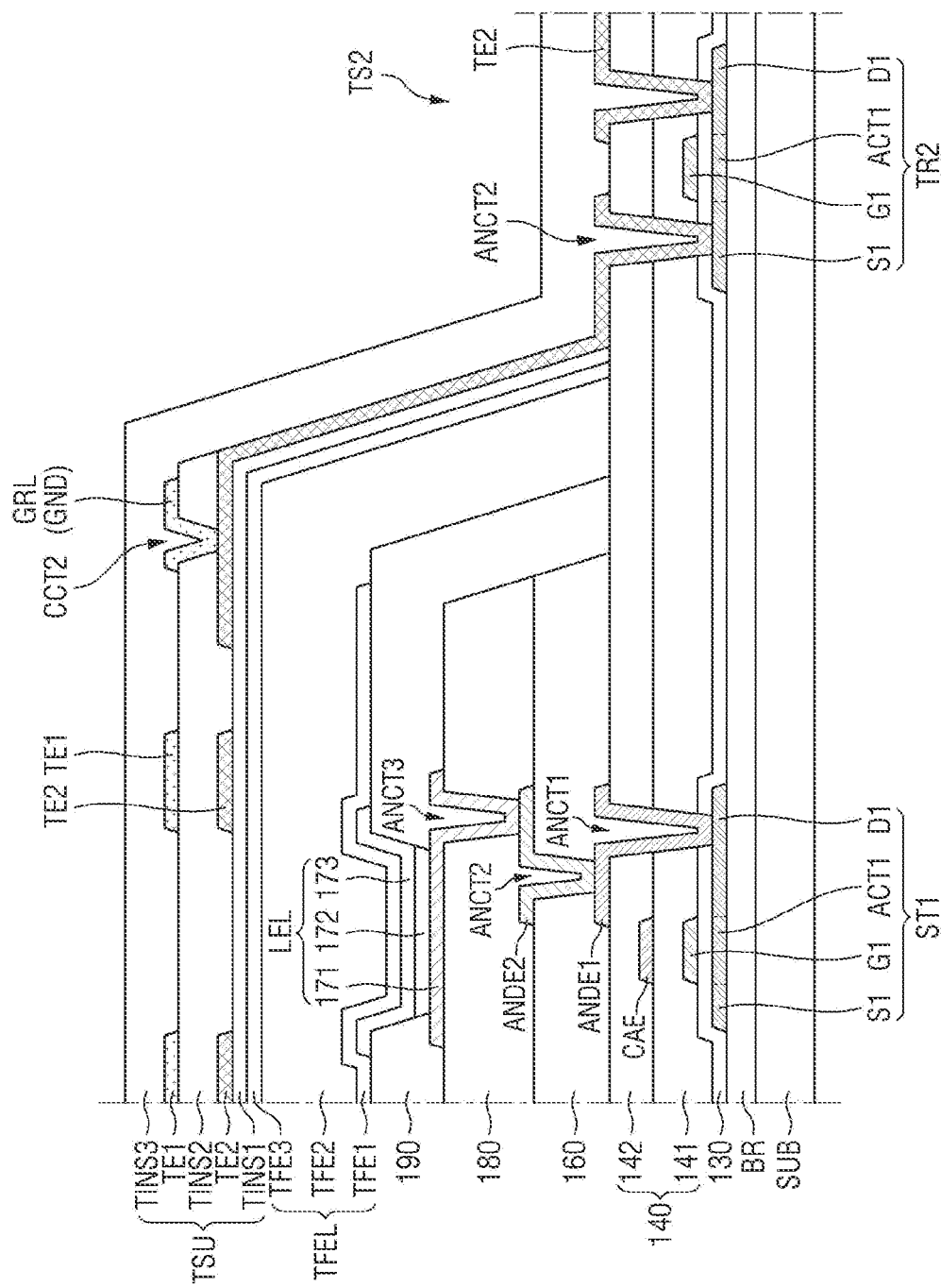
FIG. 7 is a cross-sectional view showing a cross-sectional structure of first and second touch sensing layers, and one of the second switching elements formed in the display area and on the front side of the display area according to some embodiments of the present disclosure.

FIG. 7 is a cross-sectional view showing a cross-sectional structure of first and second touch sensing layers, and one of the second switching elements formed in the display area and on the front side of the display area.

Referring to FIG. 7, the first switching elements TR1 and the second switching elements TR2 are formed in the touch peripheral area TPA.

For example, the second switching elements TR2 receive the second switching control signal input through the second switching signal line TGL formed in the touch peripheral area TPA at the gate electrode G1. In addition, the second switching elements TR2 are turned on or turned off by the second switching control signal to electrically connect/disconnects the second driving electrode TE2 to/from the low-level line GRL connected to the low-level voltage source GND. To this end, the drain or source electrodes S1 of the second switching elements TR2 may be extended toward the low-level line GRL through a second signal contact hole ANCT2 to be electrically connected to the low-level line GRL by a low-level contact hole CCT2. On the other hand, the source or drain electrode D1 of the second switching elements TR2 may be electrically connected to the second driving electrode TE2 or a contact line of the second driving electrodes TE2.

Figure 8:
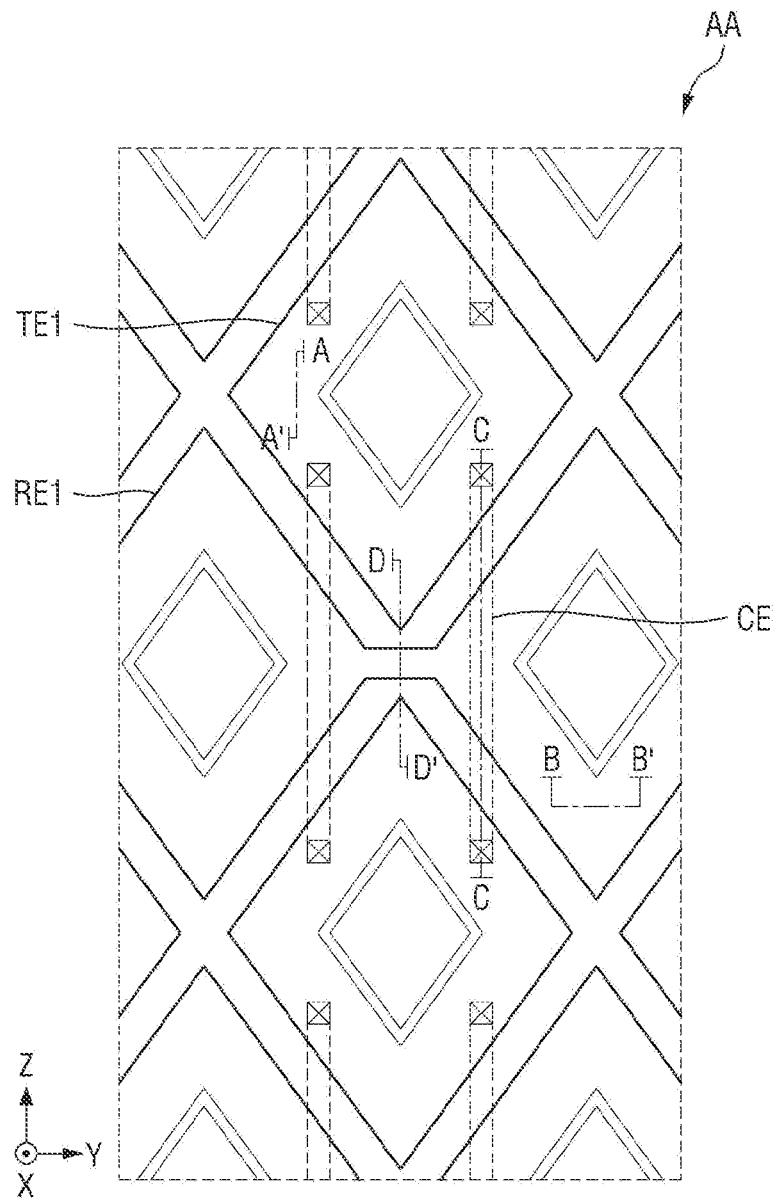
FIG. 8 is an enlarged view specifically showing a connection structure of the first driving electrode, the first sensing electrode and the connection electrodes located in area AA of FIG. 4 according to some embodiments of the present disclosure.

FIG. 8 is an enlarged view specifically showing a connection structure of the first driving electrode, the first sensing electrode and the connection electrodes located in area AA of FIG. 4.

Referring to FIG. 8, the connection electrodes CE for electrically connecting the first driving electrodes TE1 adjacent to one another in the y-axis direction are located in the second touch sensing layer TSA2 of the touch sensing unit TSU. Likewise, the connection electrodes CE for electrically connecting the second driving electrodes TE2 adjacent to one another in the y-axis direction may be located in the first touch sensing layer TSA1.

For example, the connection electrodes CE that electrically connect the first driving electrodes TE1 may be made of the same metal material as the second driving electrode TE2 when the second driving electrode TE2 is formed. Since the connection electrodes CE electrically connect adjacent ones of the first driving electrodes TE1, the adjacent first driving electrodes TE1 are not electrically connected to other first sensing electrodes TE1 or the second driving electrodes TE2. To this end, the connection electrodes CE are formed in the second touch sensing layer TSA2 so that they are not electrically connected to the first sensing electrodes RE1 or the second driving electrodes TE2. In addition, the first driving electrodes TE1 may be electrically connected to the connection electrodes CE made of the same metal as the second driving electrode TE2 through a plurality of electrode contact holes penetrating the second touch insulating layer TINS2.

On the other hand, a plurality of electrode contact holes penetrating through the second touch insulating layer TINS2 may be formed on the front side of the second driving electrodes TE2 of the second touch sensing layer TSA2, and the connection electrodes CE formed on the first touch sensing layer TSA1 may connect the adjacent second driving electrodes TE2 of the second touch sensing layer TSA2 through the plurality of electrode contact holes.

Figure 9:
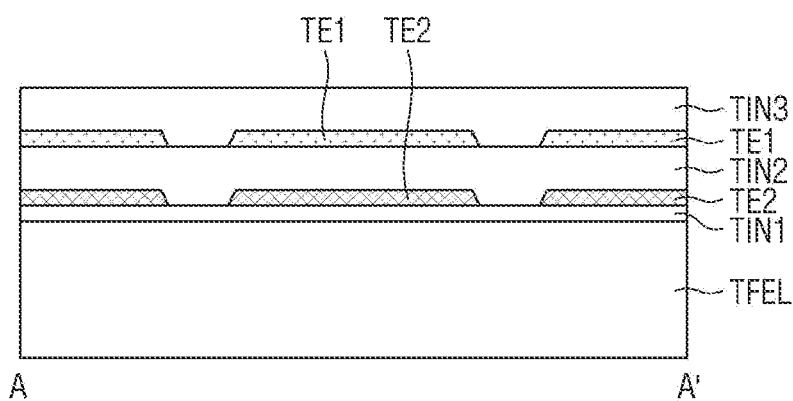
FIG. 9 is a cross-sectional view taken along the line A-A' of FIG. 8 according to some embodiments of the present disclosure.

FIG. 9 is a cross-sectional view taken along line A-A' of FIG. 8. Specifically, FIG. 9 is a cross-sectional view showing a structure in which the second driving electrodes TE2 located in the second touch sensing layer TSA2 and the first driving electrodes TE1 located in the first touch sensing layer TSA1 overlap each other and separated from each other.

Referring to FIG. 9, the second driving electrodes TE2 and the second sensing electrodes RE2 may be patterned in the x-axis and y-axis directions on the first touch insulating layer TINS1 of the encapsulation layer TFEL.

The second touch insulating layer TINS2 may be formed on the first touch insulating layer TINS1 including the second driving electrodes TE2 and the second sensing electrodes RE2.

The first driving electrodes TE1 and the first sensing electrodes RE1 are patterned on the second touch insulating layer TINS2 in the x-axis and y-axis directions. The second driving electrodes TE2 and the first driving electrodes TE1 overlap each other with the second touch insulating layer TINS2 interposed therebetween. Accordingly, the second driving electrodes TE2 and the first driving electrodes TE1 may be formed such that they are separated from each other with the second touch insulating layer TINS2 therebetween.

Figure 10:
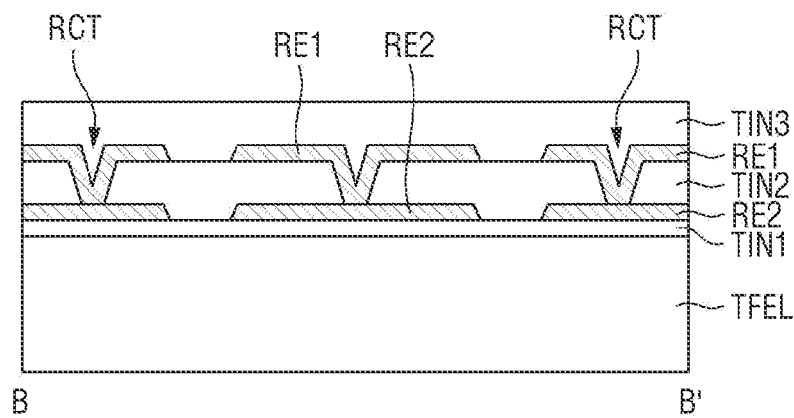
FIG. 10 is a cross-sectional view taken along the line B-B' of FIG. 8 according to some embodiments of the present disclosure.

FIG. 10 is a cross-sectional view taken along line B-B' of FIG. 8. Specifically, FIG. 10 is a cross-sectional view showing a structure in which the second sensing electrodes RE2 located in the second touch sensing layer TSA2 and the first sensing electrodes RE1 located in the first touch sensing layer TSA1 overlap each other and separated from each other.

Referring to FIG. 10, the second driving electrodes TE2 and the second sensing electrodes RE2 may be patterned in the x-axis and y-axis directions on the first touch insulating layer TINS1 of the encapsulation layer TFEL.

The second touch insulating layer TINS2 may be formed on the first touch insulating layer TINS1 including the second driving electrodes TE2 and the second sensing electrodes RE2.

Subsequently, a plurality of sensing electrode contact holes RCT is formed in the second touch insulating layer TINS2 on the front side of the second sensing electrodes RE2.

The first driving electrodes TE1 and the first sensing electrodes RE1 are patterned on the second touch insulating layer TINS2 in the x-axis and y-axis directions. The second sensing electrodes RE2 and the first sensing electrodes RE1 overlap each other with the second touch insulating layer TINS2 therebetween. Accordingly, the first sensing electrodes RE1 may be electrically connected to the second sensing electrodes RE2 through the plurality of sensing electrode contact holes RCT.

Figure 11:
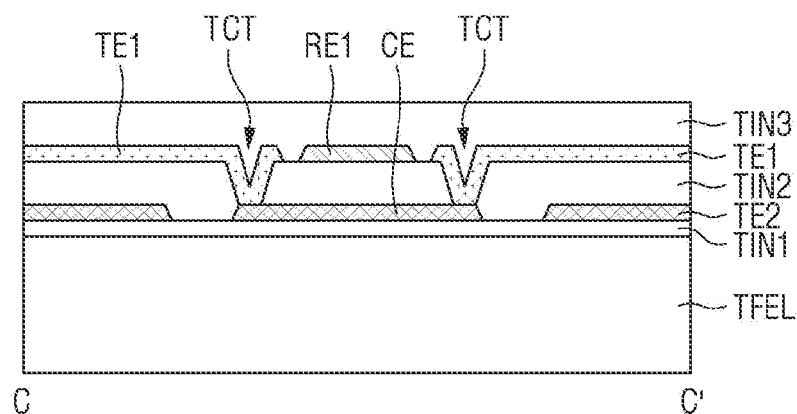
FIG. 11 is a cross-sectional view taken along the line C-C' of FIG. 8 according to some embodiments of the present disclosure.

FIG. 11 is a cross-sectional view taken along line C-C' of FIG. 8. Specifically, FIG. 11 is a cross-sectional view showing a connection electrode CE that electrically connects adjacent first driving electrodes TE1.

Referring to FIG. 11, the second driving electrodes TE2 and the second sensing electrodes RE2 may be patterned in the x-axis and y-axis directions on the first touch insulating layer TINS1. When the second driving electrodes TE2 and the second sensing electrodes RE2 are formed, the connection electrodes CE may be patterned using the same metal material as that of the second driving electrode TE2 via the same process.

The connection electrodes CE may be respectively formed where the first driving electrode TE1 that do not overlap with the first sensing electrodes RE1 are formed.

The second touch insulating layer TINS2 may be formed on the first touch insulating layer TINS1 including the second driving electrodes TE2, the second sensing electrodes RE2 and the connection electrodes CE.

A plurality of driving electrode contact holes TCT penetrating through the second touch insulating layer TINS2 is formed where the overlapping first driving electrodes TE1 on the front side of the connection electrodes CE are located.

The first driving electrodes TE1 and the first sensing electrodes RE1 are patterned in the x-axis and y-axis directions on the second touch insulating layer TINS2 including the plurality of driving electrode contact holes TCT. In this instance, the first driving electrodes TE1 are connected to the connection electrodes CE through the plurality of driving electrode contact holes TCT, so that the adjacent first driving electrodes TE1 are electrically connected to the plurality of driving electrode contact holes TCT through the connection electrodes CE in the y-axis direction.

As such, the connection electrodes CE may be made of the same metal material as the second driving electrodes TE2 when the second driving electrodes TE2 are formed, and the first driving electrodes TE1 may be electrically connected to the connection electrodes CE through the plurality of driving electrode contact holes TCT penetrating the second touch insulating layer TINS2.

Figure 12:
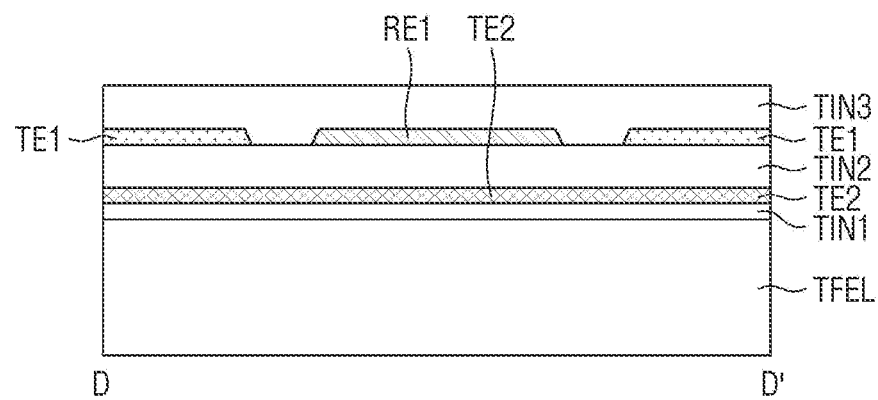
FIG. 12 is a cross-sectional view taken along the line D-D' of FIG. 8 according to some embodiments of the present disclosure.

FIG. 12 is a cross-sectional view taken along line D-D' of FIG. 8. Specifically, FIG. 12 is a cross-sectional view showing a cross-sectional structure of a first touch node TN1 where a first driving electrode and a first sensing electrode cross each other.

Referring to FIG. 12, the second driving electrodes TE2 and the second sensing electrodes RE2 may be patterned in the x-axis and y-axis directions on the first touch insulating layer TINS1. The second driving electrodes TE2 adjacent to one another in the y-axis direction may be patterned such that they are electrically connected with one another. In addition, as shown in FIG. 11, the connection electrodes CE may be patterned and formed using the same metal material as that of the second driving electrode TE2 via the same process. On the other hand, the second sensing electrodes RE2 adjacent to one another in the x-axis direction are separated from one another.

The second touch insulating layer TINS2 may be formed on the first touch insulating layer TINS1 including the second driving electrodes TE2 and the second sensing electrodes RE2. As shown in FIG. 10, a plurality of sensing electrode contact holes RCT is formed in the second touch insulating layer TINS2 on the front side of the second sensing electrodes RE2.

The first driving electrodes TE1 and the first sensing electrodes RE1 are patterned on the second touch insulating layer TINS2 in the x-axis and y-axis directions. In this instance, the first sensing electrodes RE1 adjacent to one another in the x-axis direction may be patterned so that they are electrically connected to one another. In addition, the first sensing electrodes RE1 may be electrically connected to the second sensing electrodes RE2 through the plurality of sensing electrode contact holes RCT.

On the other hand, the first driving electrodes TE1 adjacent to one another in the y-axis direction are separated from one another. Such first driving electrodes TE1 are connected to the connection electrodes CE through the plurality of driving electrode contact holes TCT, so that the adjacent first driving electrodes TE1 are electrically connected in the y-axis direction through the driving electrode contact holes TCT and the connection electrodes CE.

Figure 13:
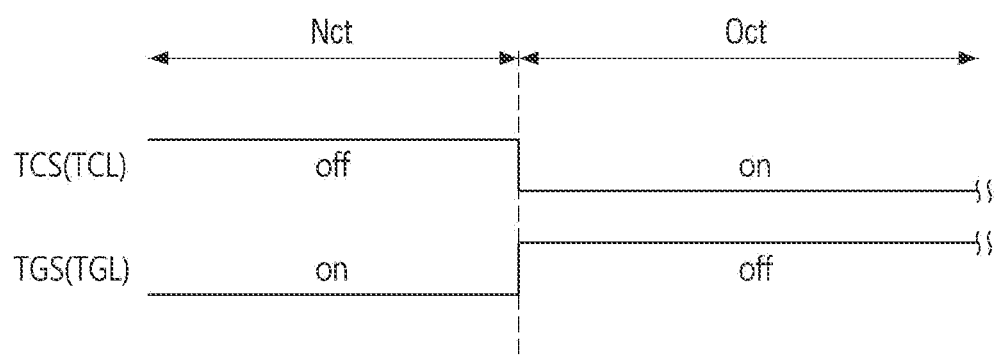
FIG. 13 is a waveform diagram showing switching control signals of the touch driver circuit shown in FIGS. 1 and 2 according to some embodiments of the present disclosure.
Figure 14:
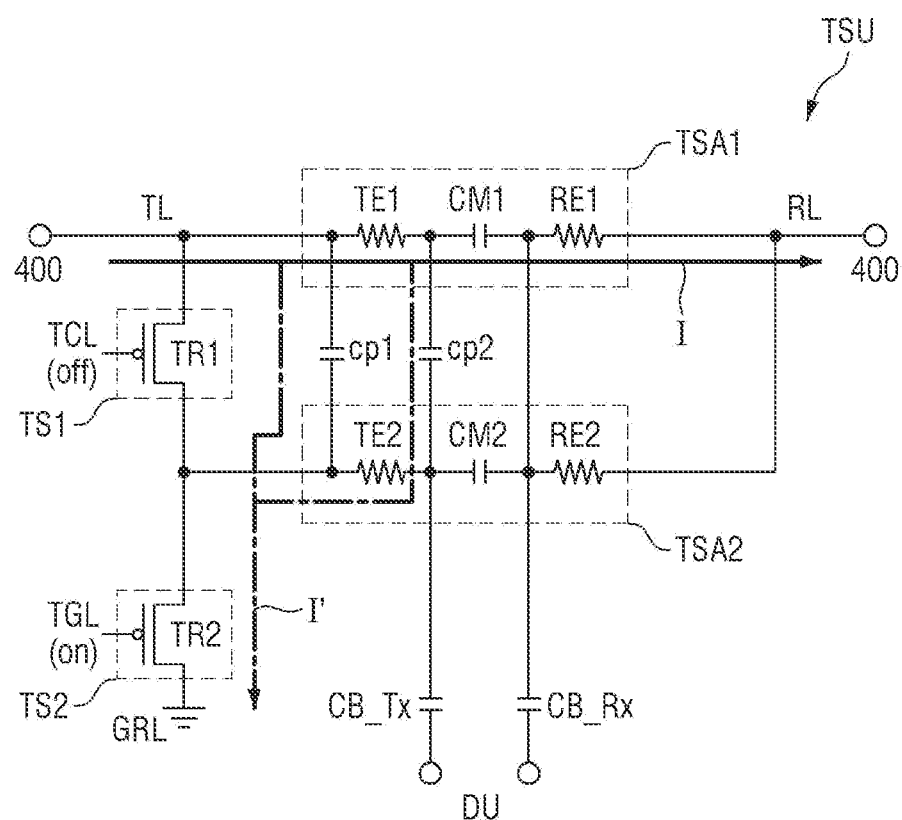
FIG. 14 is a circuit diagram showing a driving operation of one first touch electrode, one second touch electrode, a driving switching circuit and a sensing switching circuit shown in FIG. 14 according to some embodiments of the present disclosure.

FIG. 13 is a waveform diagram showing switching control signals of the touch driver circuit shown in FIGS. 1 and 2. FIG. 14 is a circuit diagram showing a driving operation of one first touch electrode, one second touch electrode, a driving switching circuit and a sensing switching circuit shown in FIG. 14.

Initially, referring to FIG. 13, the touch driver circuit 400 designates a period in which there is no touch and thus no touch coordinates are detected as a non-touch sensing period Nct. Accordingly, during the non-touch sensing period Nct, the touch driver circuit 400 supplies the second switching control signal TGS of the gate-on level to the second switching element TR2 of the second driving switching circuits TS2 through the second switching signal lines TGL.

On the other hand, during the non-touch sensing period Nct, the touch driver circuit 400 supplies a first switching control signal TCS of the gate-off level to the first switching element TR1 of the first driving switching circuits TS1 through the first switching signal lines TCL. Touch driving signals are supplied to the first driving electrodes TE1.

Referring to FIG. 14, during the non-touch sensing period Nct, the first switching element TR1 of the first driving switching circuits TS1 is turned off by the first switching control signal TCS, so that the second driving electrode TE2 is electrically disconnected from the first driving electrode TE1. Touch driving signals may be supplied to the first driving electrodes TE1, so that electric current may flow as indicated by arrow I, and a touch sensing signal may be output through the first sensing electrodes RE1.

On the other hand, during the non-touch sensing period Nct, the second switching element TR2 of the second driving switching circuits TS2 is turned on by the second switching control signal TGS, to electrically connect the second driving electrode TE2 to the low-level line GRL connected to the low-level voltage source GND. Accordingly, during the non-touch sensing period Nct, the second driving electrodes TE2 are connected to the low-level voltage source GND, and the second driving electrodes TE2 form capacitors with the first driving electrodes TE1, so that the EMI of the first driving electrodes TE1 flows to the low-level voltage source GND as indicated by arrow I'.

Subsequently, during the touch sensing period Oct, the touch driver circuit 400 supplies the first switching control signal TCS of the gate-on level to the first switching element TR1 of the first driving switching circuits TS1. Then, the touch driver circuit 400 supplies the second switching control signal TGS of the gate-off level to the second switching element TR2 of the second driving switching circuits TS2 through the second switching signal lines TGL.

Figure 15:
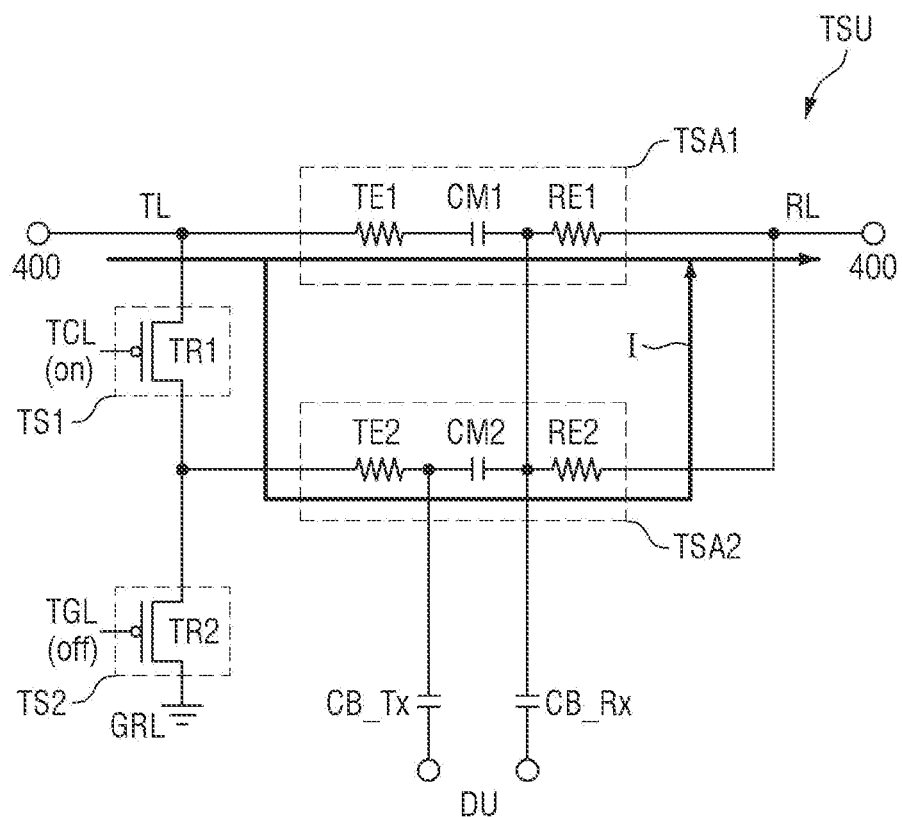
FIG. 15 is another circuit diagram showing a driving operation of the first touch electrode, the second touch electrode, the driving switching circuit and the sensing switching circuit shown in FIG. 14 according to some embodiments of the present disclosure.

FIG. 15 is another circuit diagram showing a driving operation of the first touch electrode, the second touch electrode, the driving switching circuit and the sensing switching circuit shown in FIG. 14.

Referring to FIG. 15, during the touch sensing period Oct, the second switching element TR2 is turned off by the second switching control signal TGS to separate the second driving electrode TE2 from the low-level line GRL.

On the other hand, during the touch sensing period Oct, the first switching element TR1 of the first driving switching circuits TS1 is turned on by the first switching control signal TCS, so that the second driving electrode TE2 and the first driving electrode TE1 are electrically connected. Therefore, as indicated by arrow I in FIG. 15, during the touch sensing period Oct, the first touch electrode SEN1 and the second touch electrode SEN2 are connected in parallel to sense a touch by a touch input means or a part of a user's body.

Figure 16:
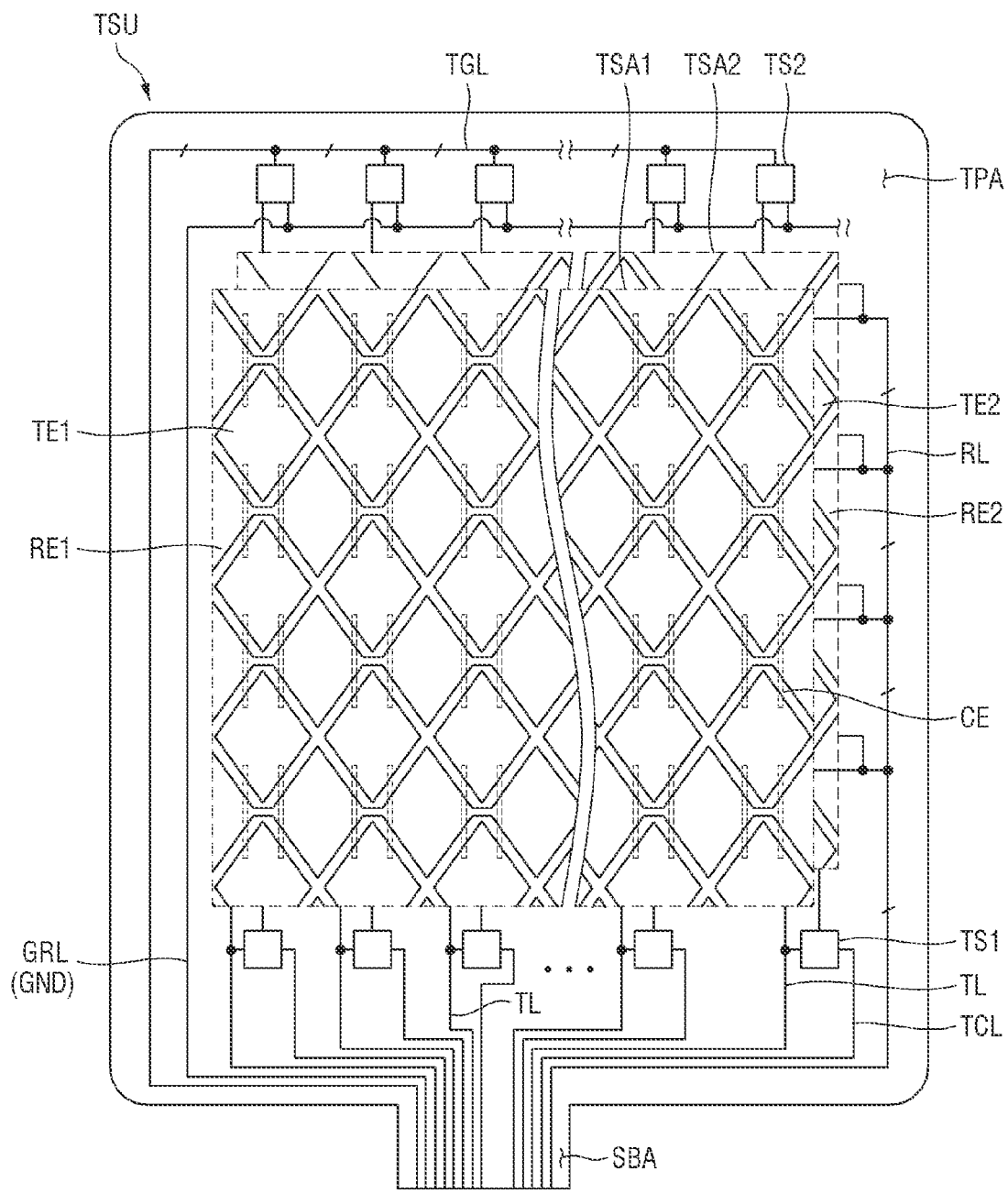
FIG. 16 is a view showing a touch sensing module according to some embodiments of the present disclosure.

FIG. 16 is a view showing an example of a layout of a touch sensing module according to some embodiments of the present disclosure.

Referring to FIG. 16 in conjunction with FIG. 4, the first touch electrodes SEN1 and the second touch electrodes SEN2 may be located in the main area MA as a double layer with a touch insulating layer therebetween such that they overlap each other, and at least one of the first and second touch electrodes SEN1 and SEN2 may be formed as a transparent electrode made of a transparent material.

For example, the two types of electrodes forming the second touch electrodes SEN2, i.e., the second driving electrodes TE2 and the second sensing electrodes RE2 may be formed as conductive metal electrodes made of one of molybdenum (Mo), aluminum (Al), chromium (Cr), gold (Au), titanium (Ti), nickel (Ni), neodymium (Nd) and copper (Cu) or an alloy thereof.

Alternatively, the two types of electrodes forming the first touch electrodes SEN1, i.e., the first driving electrodes TE1 and the first sensing electrodes RE1 may be made of a transparent metal material such as indium tin oxide (ITO).

When the first driving electrodes TE1 and the first sensing electrodes RE1 are made of a transparent metal material, the first driving electrodes TE1 and the first sensing electrodes RE1 may be formed in a polygonal shape when viewed from the top without forming separate second dummy electrodes or transmission holes.

Figure 17:
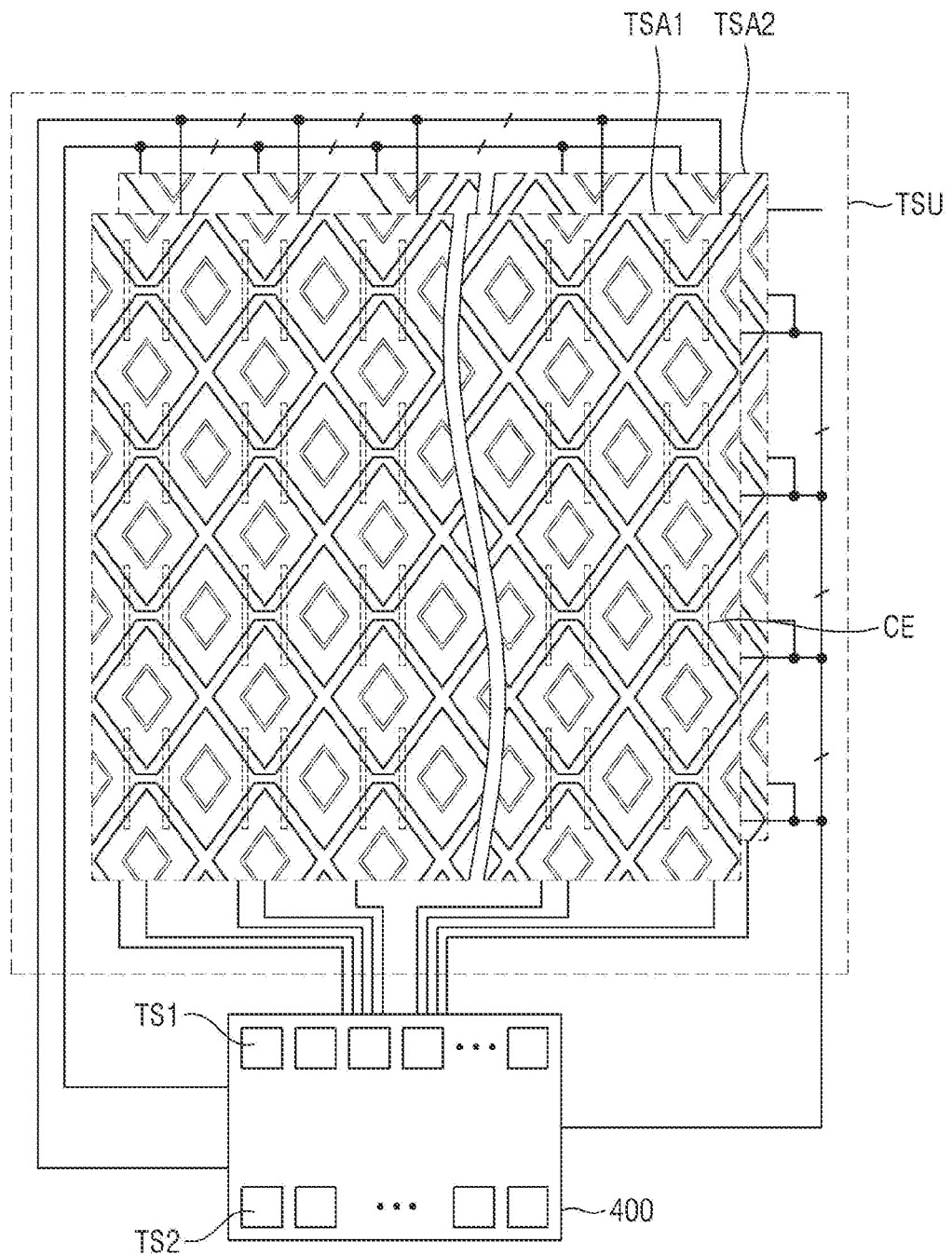
FIG. 17 is a view showing a layout of a touch sensing module according to some embodiments of the present disclosure.

FIG. 17 is a view showing another example of a layout of a touch sensing module according to some embodiments of the present disclosure.

Referring to FIG. 17, one or more switching circuits among the first driving switching circuits TS1 including the first switching element TR1 and the second driving switching circuits TS2 including the second switching element TR2 may be integrated and thus may be formed as an integrated circuit.

Alternatively, at least one of the first driving switching circuits TS1 and the second driving switching circuits TS2 may be formed integrally with the touch driver circuit 400 in the form of an integrated circuit.

On the other hand, at least one of the first driving switching circuits TS1 and the second driving switching circuits TS2 may be formed integrally with the display driver circuit 200 in the form of an integrated circuit.

The integrated first driving switching circuits TS1 and second driving switching circuits TS2 may be separately arranged in the non-display area NDA of the display panel 100 or the circuit board 300.

Figure 18:
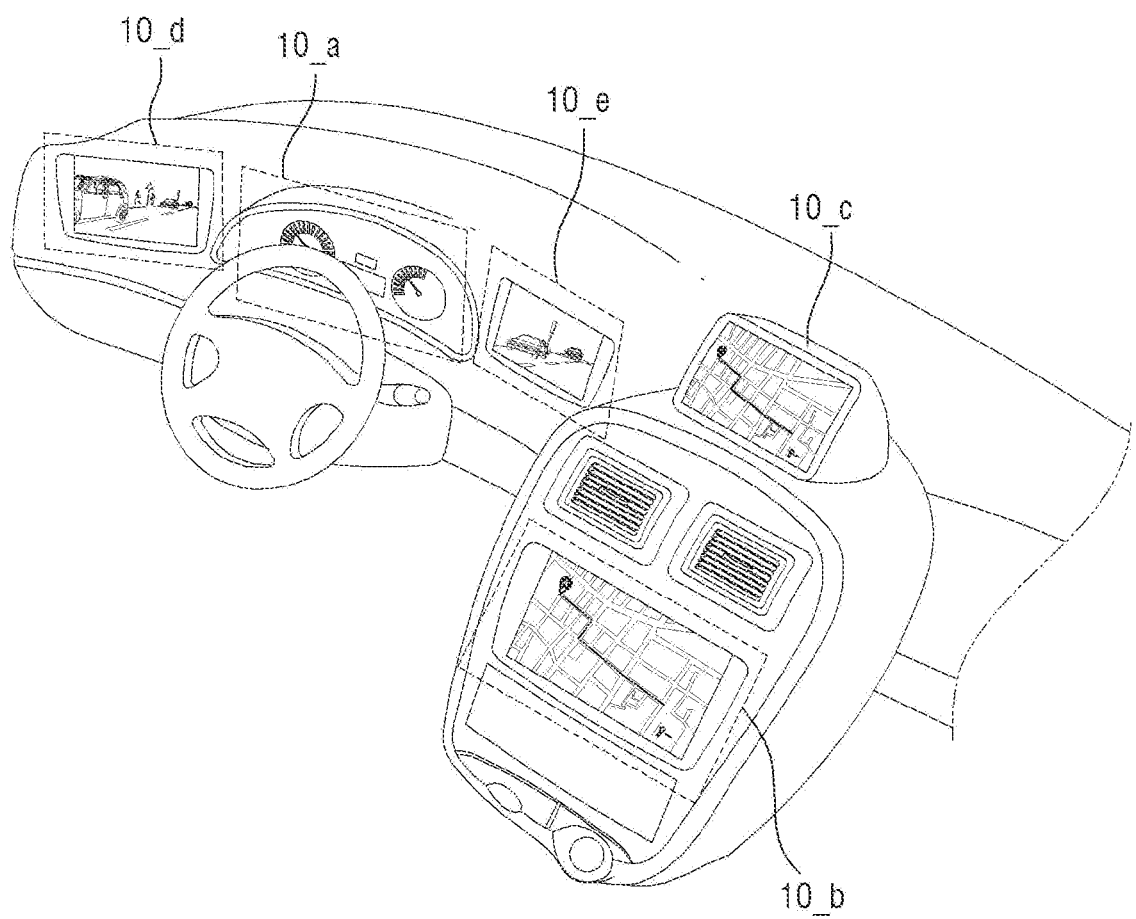
FIG. 18 is a view showing an example of an instrument cluster and a center fascia for a vehicle which include display devices according to some embodiments of the present disclosure.

FIG. 18 is a view showing an example of an instrument cluster and a center fascia for a vehicle which include display devices according to some embodiments of the present disclosure.

FIG. 18 shows a vehicle in which display devices 10_a, 10_b, 10_c, 10_d and 10_e according to some embodiments for vehicles are applied. The first display devices 10_a for vehicles according to some embodiments may be applied to the dashboard of a vehicle, or the second display devices 10_b for vehicles according to some embodiments may be applied to the center fascia of a vehicle. In addition, the third display devices 10_c for vehicles according to some embodiments may be applied to a center information display (CID) located on the dashboard of a vehicle. In addition, the fourth and fifth display devices 10_d and 10_e according to some embodiments of the present disclosure may be applied to a room mirror display, which can replace side mirrors of a vehicle.

In concluding the detailed description, those skilled in the art will appreciate that many variations and modifications can be made to the example embodiments without substantially departing from the principles of embodiments according to the present invention. Therefore, the disclosed example embodiments of the invention are used in a generic and descriptive sense only and not for purposes of limitation.

What is claimed is:

1. A touch sensing module comprising:
   first driving electrodes arranged in parallel;
   first sensing electrodes intersecting the first driving electrodes;
   second driving electrodes on a rear side of the first driving electrode with a touch insulating layer therebetween such that they are associated with the first driving electrodes, respectively;
   second sensing electrodes on a rear side of the first sensing electrodes with the touch insulating layer therebetween such that they are associated with the first sensing electrodes, respectively;
   driving switching circuits electrically connecting the second driving electrodes to the first driving electrodes, respectively, or to a low-level voltage source; and
   a touch driver circuit configured to supply touch driving signals to the first driving electrodes and to detect touch sensing signals through the first sensing electrodes to detect touch position coordinates.

2. The touch sensing module of claim 1, wherein the driving switching circuits comprise
   first driving switching circuits configured to electrically connect/disconnect the second driving electrodes to/from the first driving electrodes, respectively, in response to a first switching control signal from the touch driver circuit; and
   second driving switching circuits configured to electrically connect/disconnect the second driving electrodes to/from the low-level voltage source in response to a second switching control signal from the touch driver circuit.

3. The touch sensing module of claim 2, wherein the first driving switching circuits comprise at least one first switching element configured to electrically connect/disconnect at least one of the second driving electrodes to/from at least one of the first driving electrodes in response to the first switching control signal, and
   wherein the second driving switching circuits comprise at least one second switching element configured to electrically connect/disconnect at least one of the second driving electrodes to/from the low-level voltage source in response to the second switching control signal.

4. The touch sensing module of claim 3, wherein the touch driver circuit, in a non-touch sensing period, is configured to supply the second switching control signal of a gate-on level to the second driving switching circuits, and the first switching control signal of a gate-off level to the first driving switching circuits.

5. The touch sensing module of claim 3, wherein the touch driver circuit, in a touch sensing period, is configured to supply the second switching control signal of a gate-off level to the second driving switching circuits, and the first switching control signal of a gate-on level to the first driving switching circuits.

6. The touch sensing module of claim 2, wherein the touch driver circuit is configured to control the driving switching circuits so that the second driving electrodes are electrically disconnected from the first driving electrodes and connected to the low-level voltage source during a non-touch sensing period, and to supply touch driving signals to the first driving electrodes to detect the touch sensing signals through the first sensing electrodes during the non-touch sensing period.

7. The touch sensing module of claim 6, wherein the touch driver circuit is configured to control the driving switching circuits so that the second driving electrodes are electrically connected to the first driving electrodes and disconnected from to the low-level voltage source during a touch sensing period, and to supply touch driving signals to the first driving electrodes to detect the touch sensing signals through the first sensing electrodes during the touch sensing period.

8. The touch sensing module of claim 6, wherein the first sensing electrodes and the second sensing electrodes are electrically connected through at least one contact hole or at least one line.

9. The touch sensing module of claim 2, wherein the first driving electrodes are arranged in a first axis direction and a second axis direction, and adjacent ones of the first driving electrodes in the first axis direction are electrically connected while adjacent ones of the first driving electrodes in the second axis direction are electrically separated, and wherein adjacent ones of the first driving electrodes in the first axis direction are electrically connected through connection electrodes.

10. The touch sensing module of claim 9, wherein the first sensing electrodes are arranged in the first axis direction and the second axis direction, and adjacent ones of the first driving electrodes in the first axis direction are electrically connected while wherein adjacent ones of the first sensing electrodes in the first axis direction are electrically separated, and wherein the second sensing electrodes are all separated and electrically connected to the first sensing electrodes on a front side through at least one contact hole.

11. The touch sensing module of claim 9, wherein the second driving electrodes are arranged in the first axis direction and the second axis direction, and adjacent ones of the second driving electrodes in the first axis direction are electrically connected while adjacent ones of the second driving electrodes in the second axis direction are electrically separated, and wherein adjacent ones of the second driving electrodes in the first axis direction are in direct contact with each other and electrically connected to each other.

12. The touch sensing module of claim 11, wherein the connection electrodes are made of a same material as the second driving electrodes and are formed on a same layer as the second driving electrodes such that they are not electrically in contact with the second driving electrodes, and wherein adjacent ones of the first driving electrodes are electrically connected by a plurality of contact holes.

13. The touch sensing module of claim 1, wherein at least one of the first driving electrodes, the first sensing electrodes, the second driving electrodes, or the second sensing electrodes is formed of a transparent metal material comprising indium tin oxide (ITO).

14. The touch sensing module of claim 1, wherein the driving switching circuits and the touch driver circuit are integrated and formed as an integrated circuit, and the integrated circuit is on a circuit film or a circuit board separately from the first and second driving electrodes.

15. A display device comprising:
a display panel comprising a display area in which sub-pixels are arranged; and
a touch sensing module on a front side of the display panel to sense a touch,
wherein the touch sensing module comprises:
first driving electrodes arranged in parallel;
first sensing electrodes intersecting the first driving electrodes;
second driving electrodes on a rear side of the first driving electrode with a touch insulating layer therebetween such that they are associated with the first driving electrodes, respectively;
second sensing electrodes on a rear side of the first sensing electrodes with the touch insulating layer therebetween such that they are associated with the first sensing electrodes, respectively;
driving switching circuits configured to electrically connect the second driving electrodes to the first driving electrodes, respectively, or to a low-level voltage source; and
a touch driver circuit configured to supply touch driving signals to the first driving electrodes and to detect touch sensing signals through the first sensing electrodes to detect touch position coordinates.

16. The display device of claim 15, wherein the driving switching circuits comprise
first driving switching circuits configured to electrically connect/disconnect the second driving electrodes to/from the first driving electrodes, respectively, in response to a first switching control signal from the touch driver circuit; and
second driving switching circuits configured to electrically connect/disconnect the second driving electrodes to/from the low-level voltage source in response to a second switching control signal from the touch driver circuit.

17. The display device of claim 16, wherein the first driving switching circuits comprise at least one first switching element configured to electrically connect/disconnect at least one of the second driving electrodes to/from at least one of the first driving electrodes in response to the first switching control signal, and wherein the second driving switching circuits comprise at least one second switching element configured to electrically connect/disconnect at least one of the second driving electrodes to/from the low-level voltage source in response to the second switching control signal.

18. The display device of claim 16, wherein the touch driver circuit is configured to control the driving switching circuits so that the second driving electrodes are electrically disconnected from the first driving electrodes and connected to the low-level voltage source during a non-touch sensing period, and to supply touch driving signals to the first driving electrodes to detect the touch sensing signals through the first sensing electrodes during the non-touch sensing period.

19. The display device of claim 16, wherein the first driving electrodes are arranged in a first axis direction and a second axis direction, and adjacent ones of the first driving electrodes in the first axis direction are electrically connected while adjacent ones of the first driving electrodes in the second axis direction are electrically separated, and wherein adjacent ones of the first driving electrodes in the first axis direction are electrically connected through connection electrodes.

20. The display device of claim 19, wherein the first sensing electrodes are arranged in the first axis direction and the second axis direction, and adjacent ones of the first driving electrodes in the first axis direction are electrically connected while adjacent ones of the first sensing electrodes in the first axis direction are electrically separated, and wherein the second sensing electrodes are all separated and electrically connected to the first sensing electrodes on a front side through at least one contact hole.

* * * * *